(12) United States Patent
Palmer et al.

(10) Patent No.: US 12,113,408 B2
(45) Date of Patent: Oct. 8, 2024

(54) WIND GENERATOR ROTOR CONNECTION REPLACEMENT

(71) Applicant: Electromechanical Engineering Associates, Inc., Monroeville, PA (US)

(72) Inventors: Corey Allen Palmer, Greensburg, PA (US); Lauren Theresa Haley, Pittsburgh, PA (US); Christopher J. Mascaro, Gibsonia, PA (US); Thomas J. Schildkamp, Greensburg, PA (US); Jason Sinkhorn, Monroeville, PA (US)

(73) Assignee: ELECTROMECHANICAL ENGINEERING ASSOCIATES, INC., Monroeville, PA (US)

( * ) Notice: Subject to any disclaimer, the term of this patent is extended or adjusted under 35 U.S.C. 154(b) by 275 days.

(21) Appl. No.: 17/683,095

(22) Filed: Feb. 28, 2022

(65) Prior Publication Data

US 2022/0278581 A1  Sep. 1, 2022

Related U.S. Application Data

(60) Provisional application No. 63/286,526, filed on Dec. 6, 2021, provisional application No. 63/154,178, filed on Feb. 26, 2021, provisional application No. 63/153,981, filed on Feb. 26, 2021, provisional application No. 63/154,396, filed on Feb. 26, 2021.

(51) Int. Cl.
| | |
|---|---|
| *H02K 3/50* | (2006.01) |
| *H02K 1/24* | (2006.01) |
| *H02K 3/28* | (2006.01) |
| *H02K 15/00* | (2006.01) |

(52) U.S. Cl.
CPC ........... *H02K 15/0006* (2013.01); *H02K 1/24* (2013.01); *H02K 3/28* (2013.01); *H02K 3/50* (2013.01); *H02K 2203/06* (2013.01); *H02K 2203/09* (2013.01)

(58) Field of Classification Search
CPC ...................................................... H02K 3/50
USPC ............................................................ 310/71
See application file for complete search history.

(56) References Cited

U.S. PATENT DOCUMENTS

| | | | |
|---|---|---|---|
| 4,611,138 A | * | 9/1986 | Kindig ..................... H02K 3/50 310/71 |
| 4,870,308 A | | 9/1989 | Sismour, Jr. |

(Continued)

OTHER PUBLICATIONS

International Search Report and Written Opinion dated May 17, 2022 for corresponding PCT Application No. PCT/US2022/018196.

(Continued)

*Primary Examiner* — Alexander Talpalatski
(74) *Attorney, Agent, or Firm* — Dentons Cohen & Grigsby P.C.

(57) ABSTRACT

Devices, systems, and methods for repair and upgrade of the connection between a winding and a wye ring of a rotating electric machine. The system generally includes an attachment lug and a flexible lead having a curved central region formed of several layers of laminated copper. A first end of the flexible lead may be connected to the winding by the attachment lug and a second end of the flexible lead may be connected to the wye ring. The system may further include a wye ring assembly specifically configured to provide attachment for the connection elements.

20 Claims, 22 Drawing Sheets

(56) References Cited

U.S. PATENT DOCUMENTS

| | | | |
|---|---|---|---|
| 5,705,866 A * | 1/1998 | Oguchi | H02K 1/187 |
| | | | 310/90 |
| 6,280,265 B1 | 8/2001 | Hopeck et al. | |
| 7,002,270 B2 | 2/2006 | Zhang et al. | |
| 10,177,621 B2 | 1/2019 | Kunihiro et al. | |
| 2003/0201688 A1 | 10/2003 | Yamamura et al. | |
| 2004/0217662 A1 * | 11/2004 | Zhang | H02K 3/51 |
| | | | 310/71 |
| 2008/0088191 A1 * | 4/2008 | Park | H02K 5/225 |
| | | | 310/71 |
| 2013/0049501 A1 | 2/2013 | Fujisaki | |
| 2013/0181569 A1 | 7/2013 | Nakagawa et al. | |
| 2015/0059163 A1 | 3/2015 | Neumann et al. | |
| 2018/0055529 A1 | 3/2018 | Messerly et al. | |
| 2018/0205297 A1 | 7/2018 | Toledo et al. | |
| 2019/0006905 A1 | 1/2019 | Lindwurm et al. | |

OTHER PUBLICATIONS

International Search Report and Written Opinion dated May 18, 2022 for corresponding PCT Application No. PCT/US2022/018216.

* cited by examiner

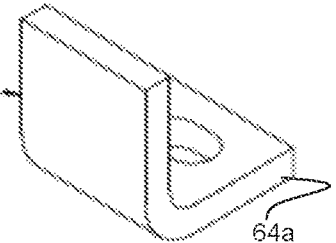
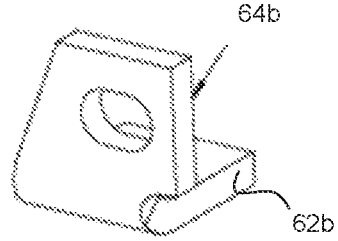
FIG. 6A  FIG. 6B
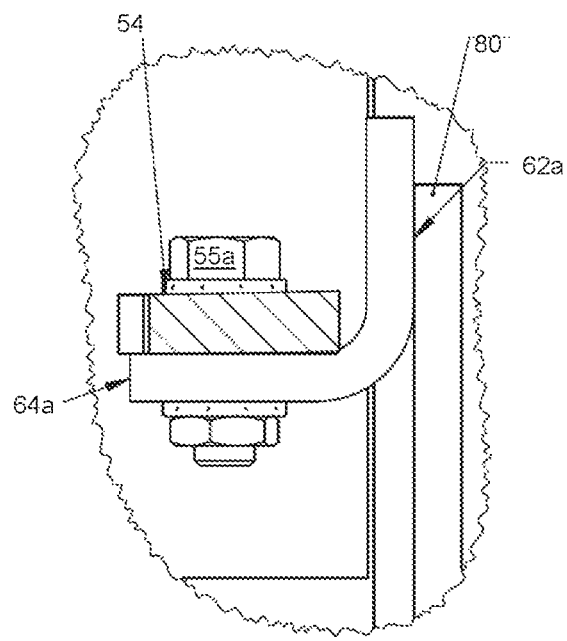
FIG. 6C

WIND GENERATOR ROTOR CONNECTION REPLACEMENT

CROSS REFERENCE TO RELATED APPLICATIONS

The present application claims priority to U.S. Provisional Patent Application Ser. Nos. 63/154,178, 63/153,981, and 63/154,396, all filed Feb. 26, 2021, and U.S. Provisional Patent Application Ser. No. 63/286,526, filed Dec. 6, 2021, each of which is incorporated herein in its entirety.

FIELD OF INVENTION

This disclosure generally relates to devices, systems, and methods for replacement and upgrade of a generator rotor phase and neutral ring connection.

BACKGROUND

The use of wind turbines to capture wind power is growing at a fast pace worldwide. The Doubly-Fed Induction Generator (DFIG) is widely adopted in wind turbines because of its variable speed operational capability, low operating noise, mechanical stress mitigation, and control flexibility for active and reactive power.

The DFIG consists of a three-phase wound rotor and a three-phase wound stator. The rotor is fed with a three-phase AC signal that induces an AC current in the rotor windings. As the wind turbines rotate, they exert mechanical force on the rotor causing it to rotate. As the rotor rotates, the magnetic field produced due to the AC current also rotates at a speed proportional to the frequency of the AC signal applied to the rotor windings. As a result, a constantly rotating magnetic flux passes through the stator windings causing induction of an AC current in the stator winding. Thus, the speed of rotation of the stator magnetic field depends on the rotor speed as well as the frequency of the AC current fed to the rotor windings.

Many types of DFIG rotor connection schemes exist and are produced by a variety of manufacturers. The rotor connection scheme, colloquially called "wye rings", is the electrical connection for the three-phase winding housed by the rotor. The rotor is connected in a wye configuration; hence the term wye rings. The wye rings themselves consist of connections for each of the three phases, a neutral ring, and in most designs, one or more parallel jumpers between connections of the same phase.

Original manufacturer DFIG rotor connection schemes have a plurality of failure modes. Some of the failure modes are a result of improper design and/or strength of the components. In most cases, however, the failures are a result of rigid mechanical coupling between the outside diameter (OD) and the inside diameter (ID) of the rotor components.

Each manufacturer constructs their rotor in a similar manner: a central steel shaft (12 of FIGS. 1A-1C); laminations fit to the steel shaft that contain slots for a rotor winding (20); coils that comprise the rotor winding housed in the lamination slots, wherein the coils extend beyond the laminations to be electrically connected via rigid copper jumpers (phase and neutral, 16, 16A, 16B) to one another and to wye rings (14, glass support ring 18 is also shown), and to coil cables (24); and banding (a composite material, typically a polyester but sometimes carbon fiber, 22) applied to the top of the coils to restrain the coils against centrifugal forces.

The banding is a semi-rigid material and dilates with centrifugal forces a small but measurable amount. The coils, which are supported by the banding, will dilate with the banding. Other components, such as the wye ring, dilate significantly less than the banding. Components connected between the wye ring and the coils, such as the copper jumpers shown in FIG. 1A, are strained by this differential dilation. These strains are typically a combination of elastic and plastic strains, and these generators are typically subject to cyclic duty due to varying wind conditions. Varying wind equates to varying speed, varying speed equates to varying dilation of the components, varying dilation of the components equates to varying strain and varying strain equates to fatigue of the components.

Fatigue is a metallurgical phenomenon by which a material subject to cyclic (and varying in this case) strains will eventually fracture. These fractured components are also current carrying as they are the parallel, neutral, and phase connections in the rotor winding. Thus, once fractured, the components may fail in a variety of ways but typically fail either mechanically, where the fracture progresses through the thickness of the part creating a complete loss of structural integrity, or electrically, where the initial fracture serves as an initiation site for electrical arcing. The arcing damages electrical insulation protecting the fractured, or adjacent, components which in turn creates a larger electrical failure.

Additional failure modes due to cyclic duty include structural failures in the glass rings that support the copper jumpers and neutral connections, banding failures from ejecting the main lead supports, main lead ratcheting and extraction from the central shaft, and failures in the insulation surrounding the main lead junctions at the central shaft.

Accordingly, methods that may eliminate the sources of these failures would be desirable. Further, devices and systems that may replace and upgrade existing generator rotor phase and neutral ring connections and/or wye ring assemblies would be desirable. Finally, devices, systems, and methods that may be applicable to DFIGs from any manufacturer would be desirable.

BRIEF SUMMARY

The present disclosure relates to systems for connection between a winding and a wye ring of a rotating electric machine, wherein the wye ring is spaced apart from a central rotor shaft of the rotating electric machine and the winding is spaced apart from the wye ring. The system generally comprises an attachment lug and a flexible lead having a longitudinal extent delimited by a first end portion and a second end portion, wherein the first end portion is connected to the winding via the attachment lug and the second end portion is connected to either of (i) the wye ring or (ii) the first end of a main lead connector. The flexible connector is designed and configured to absorb differential strains between the winding and the wye ring when the central rotor shaft rotates.

The system may further comprise a main lead connector having a first end connected to the wye ring and a second end that extends radially inward toward the central rotor shaft and is configured for attachment of main leads that extend from the central rotor shaft. The system may comprise three main lead connectors and a plurality of flexible leads.

The connections between (a) the attachment lug and the flexible lead, (b) the flexible lead and the wye ring, (c) the flexible lead and the main lead connector, and (d) the main lead connector and the wye ring may be via nut and bolt attachments.

The attachment lug may be connected to the winding via a coil post of the winding, wherein the connection is a brazed connection or a nut and bolt attachment.

The flexible lead comprises a curved central section spanning the region between the first and second end portions, wherein the curved central section is formed of two or more layers of copper. According to aspects, the curved central section of the flexible lead comprises three or four laminated layers of copper.

The flexible lead comprises an extended length from a first end to a second end that is longer than a longitudinal distance between the first and second ends.

The system may further comprise a wye ring having an open central region configured to surround the central rotor shaft of the rotating electric machine.

According to certain aspects, the wye ring generally comprises a cover plate, a phase ring, and a neutral ring, each of which may be formed of an insulating material (e.g., fiberglass). The phase and neutral rings each comprise cutouts or depressions configured to accept jumpers and neutral ring connectors, respectively, positioned therein. Each of the components may be stacked axially, with the cover plate positioned on a top surface of the axial stack and the neutral and phase rings provided in either order in the axial stack.

The wye ring may further comprise a jumper positioned within each of the depressions in the phase ring, and a neutral ring connector positioned within each of the depression in the neutral ring. The jumpers and neutral ring connectors may be formed of a conductive material.

The wye ring may further comprise a mounting ring attachable to a bottom surface of the axial stack, such as to a bottom surface of the phase or neutral ring. The mounting ring is configured to be shrunk fit onto the rotor shaft of the rotating electric machine or may be bolted to a spider structure of the rotor.

The cover plate of the wye ring may comprise three connection points on an inner diameter, each connection point configured to accept one of the three main lead connectors therein. The neutral ring may comprise two separate circumferential slots in a top surface thereof, each slot configured to accept a neutral ring connector, and two connection points contiguous with the cutouts in the cover plate to accept two of the three main lead connectors (note, some versions comprise a continuous neutral). The phase ring may comprise three separate circumferential slots in a top surface thereof, each slot configured to accept a jumper. The neutral ring may be sandwiched between the cover plate and the phase ring, or alternatively, the phase ring is sandwiched between the cover plate and the neutral ring.

The neutral ring connectors and the jumpers may comprise extensions that extend inward toward the inner diameter when the neutral ring connectors and the jumpers are positioned within the neutral ring and the phase ring, respectively, and wherein the extensions are configured for connection with the second end portion of the flexible lead.

Each of the conductive components, i.e., at least the flexible lead connectors, jumpers, and neutral ring connectors, may be formed of a solid conductive metal, such as copper. In certain embodiments, the copper electrolytic tough pitch copper or an oxygen free high conductivity copper.

The system may comprise an alternate embodiment of a wye ring having an open central region configured to surround the central rotor shaft of the rotating electric machine. The wye ring generally comprises a neutral ring having connection points for the flexible leads along an outer diameter; a phase ring comprising discrete circumferential slots in a top surface, a bottom surface, or both the top and bottom surfaces, each slot having a jumper positioned therein; a cover plate attachable to a top surface of the phase ring with the neutral ring positioned therebetween, the cover plate comprising connection points on an outer diameter configured for attachment of main leads that extend from the central rotor shaft; and a mounting ring attachable to a bottom surface of the phase ring. In this arrangement, the phase ring and cover plate may be formed of an insulating material, and the neutral ring and jumpers are formed of a conductive material. Moreover, the cover plate may be configured as six discrete main lead restraints, such as individual plates attachable to a top surface of the phase ring.

The present invention also relates to methods for installing the systems disclosed herein, wherein exemplary systems comprise flexible leads and attachment lugs, and may also comprise any of the wye rings disclosed herein.

DESCRIPTION OF THE DRAWINGS

The present invention is described in detail below with reference to the accompanying drawings. Where several embodiments are disclosed, similar components having similar functions may be denoted by an identical reference number. The embodiments below describe an alternating-current excitation synchronous rotating electric machine (i.e., doubly-fed induction generator) as an example but are applicable to any winding type rotating electric machine. The description below is merely exemplary of particular possible embodiments and is not intended to limit an aspect of the present invention to the specific aspects described below.

FIGS. 6A and 6B illustrate exemplary attachment lugs according to aspects of the present disclosure.

FIG. 6C is a cross-sectional view taken along line B-B of FIG. 5 illustrating an exemplary attachment scheme between the flexible lead, attachment lug, and a coil post of the winding of a rotating electric machine.

DETAILED DESCRIPTION

Figure 1A:
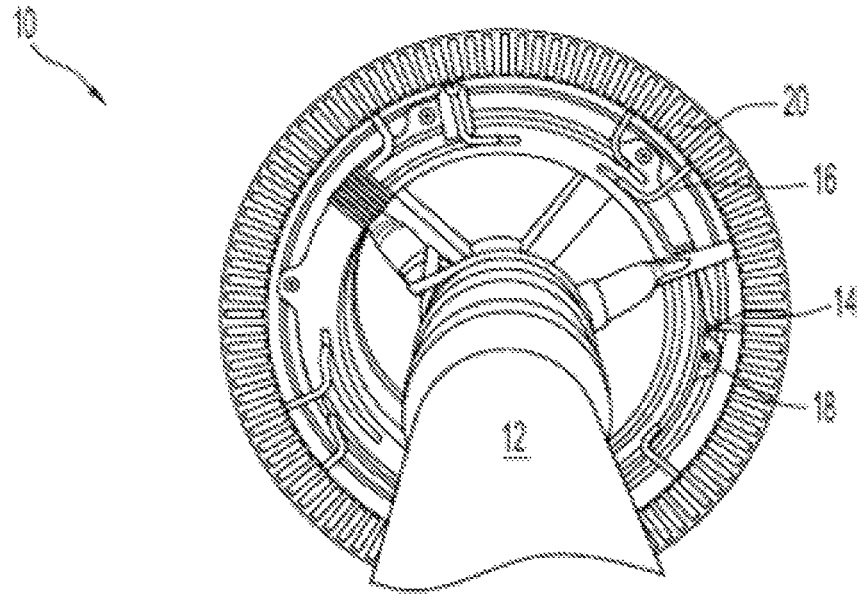
FIGS. 1A-1C illustrate prior art components of a doubly-fed induction generator (DFIG).
Figure 1B:
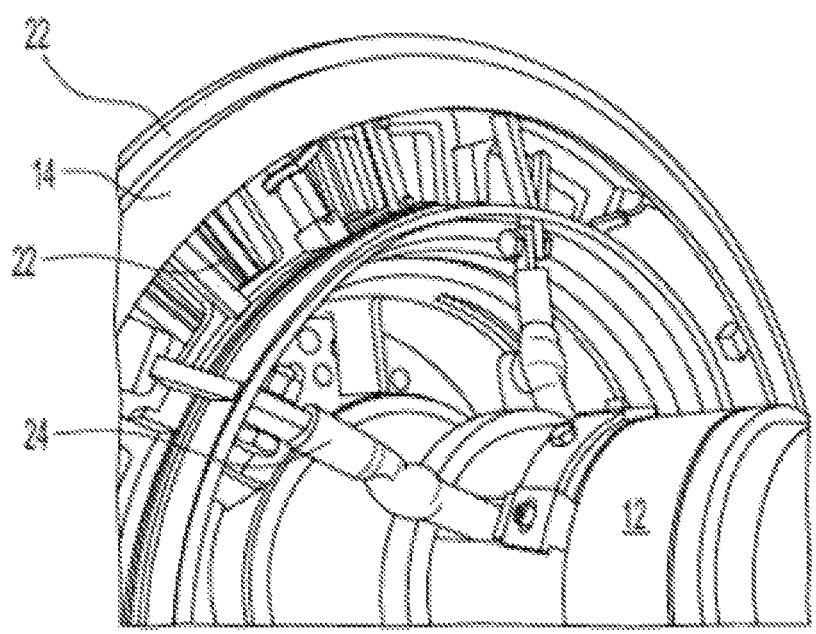
Figure 1C:
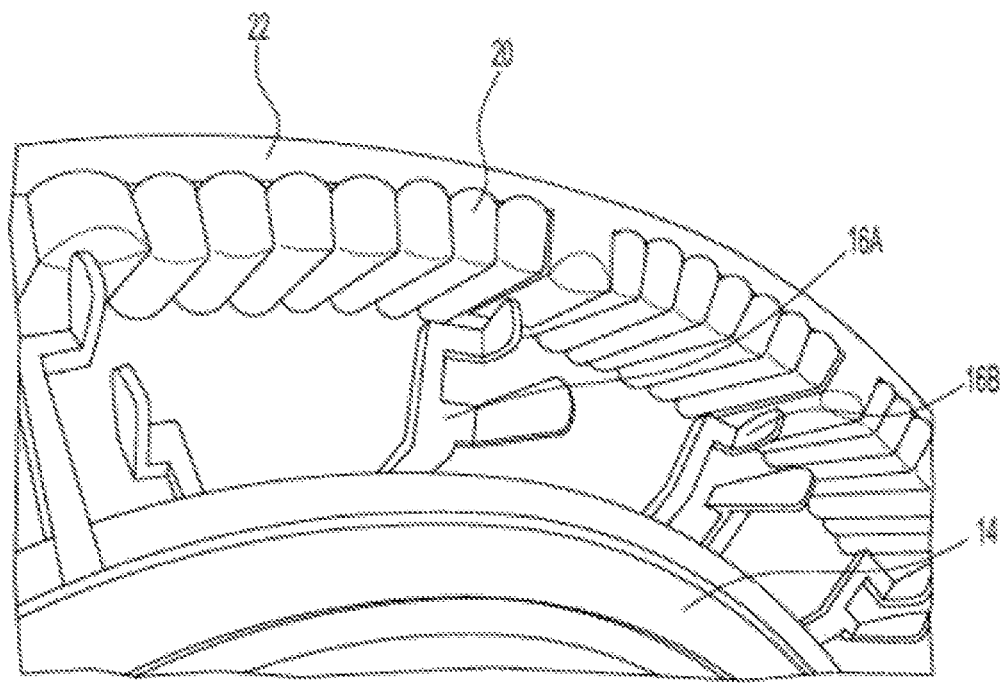

In the following description, the present invention is set forth in the context of various alternative embodiments and implementations involving systems and methods to ameliorate failures in prior art connection schemes for rotating electric machines, such as mechanical and/or electrical failures in doubly-fed induction generators caused by differential expansion of components under centrifugal forces, improper design and/or strength of the components, and the like.

Before describing the devices, systems, and methods of the present invention in detail, the following definitions and abbreviations are provided to aid in a better understanding of the scope of the present disclosure.

Definitions and Abbreviations

Various aspects of the systems, devices, and methods disclosed herein may be illustrated with reference to one or more exemplary implementations. As used herein, the term "exemplary" means "serving as an example, instance, or illustration," and should not necessarily be construed as preferred or advantageous over other variations of the systems, devices, and methods disclosed herein. "Optional" or "optionally" means that the subsequently described component, event, or circumstance may or may not be included or occur, and the description encompasses instances where the component or event is included and instances where it is not.

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the various parts of the systems and devices disclosed herein may be used unless otherwise indicated.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the terms "include", "includes", and "including" are meant to be non-limiting. As generally used herein, the terms "have", "has", and "having" are meant to be non-limiting.

Various aspects of the systems, devices, and methods disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Aspects of the Disclosure

The presently disclosed devices, systems, and methods repair and/or upgrade components of a rotating electric machine that typically lead to mechanical and electrical failures. The inventive devices and systems may replace the original manufacturer's connection components, i.e., jumpers and leads, and/or wye ring assembly with retrofit components or an entire retrofit assembly that is applicable to any manufacturer of doubly fed induction generators (DFIG). Moreover, the inventive devices and systems can be installed in shop or up-tower (in the nacelle of a wind turbine) and include replaceable wear components.

Prior art connectors are not only rigid but are generally connected between the winding and the phase and neutral rings by brazing, i.e., a rigid attachment. As such, these previous jumpers and leads do not adequately account for dilation of the banding and axial thermal expansion of the winding. In particular, since the winding generally has a weight larger than that of the neutral and phase rings and is positioned on an outermost side of the rotor, the winding experiences a large centrifugal force that causes deformation and/or displacement of the winding outward in the radial direction while the neutral and phase rings experience a lesser centrifugal force and smaller deformation/displacement forces. Thus, in the prior art systems, the rigid connectors between the winding and the phase and neutral rings, and the rigid attachments for those connectors, experience fatigue breakdown.

The present inventors conducted a root cause analysis to determine how and where the jumpers, leads, and wye ring on a standard DFIG would fail. Using results from this analysis, the inventors designed new flexible connectors that properly account for the above indicated displacements, and a wye ring that significantly improves upon the original design by eliminating the discovered failure mechanisms. The original and a new wye ring design can be seen in FIGS. 4A and 4B, respectively. Additional new designs for the wye ring of the present disclosure are found in FIGS. 13-14. Moreover, the new connectors and wye ring designs were evaluated using traditional calculations and finite element analyses to determine their acceptability and were found to provide a service life at least 50% longer than prior art designs, showing durability over tens of thousands of starts (see Examples for experimental results).

Design Concept—Flexible Jumpers and Leads

Figure 2:
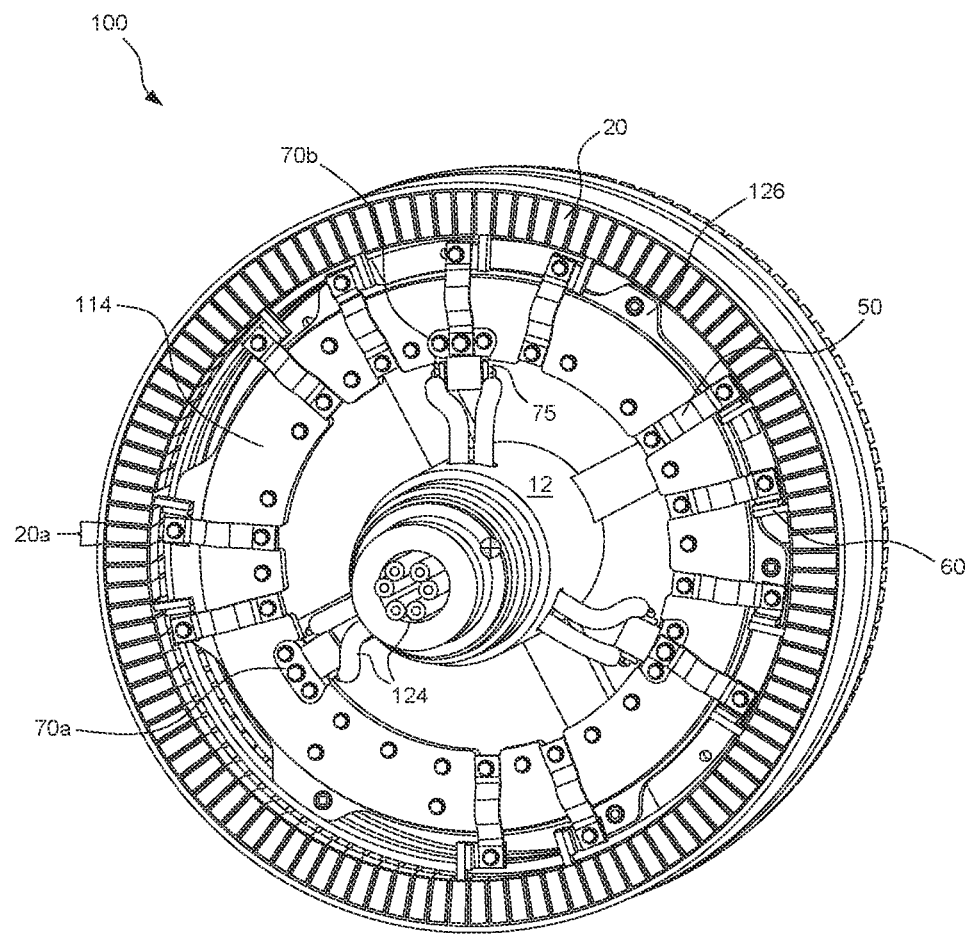
FIG. 2 illustrates components according to aspects of the present disclosure for retrofitting a DFIG.

A system according to the present disclosure is illustrated in FIG. 2. As shown, a rotating electric machine 100 generally includes a central rotor shaft 12 that supports the main electrical leads 124 therethrough. Spaced apart from the central shaft 12 is the wye ring 114 and spaced apart from the wye ring 114 are the field windings 20 positioned within lamination slots 20*a*.

Figure 3A:
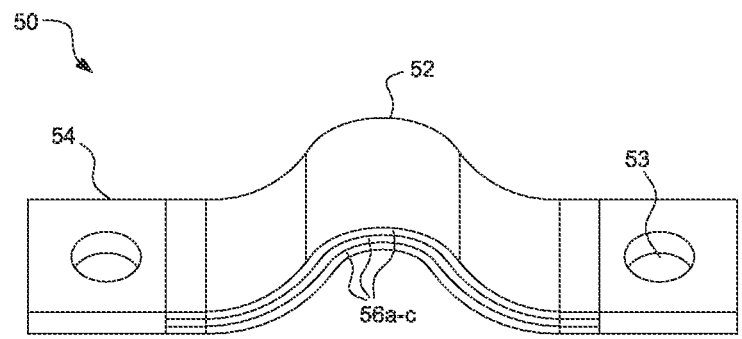
FIG. 3A illustrates a top perspective view of a flexible lead according to certain aspects of the present disclosure.
Figure 3B:
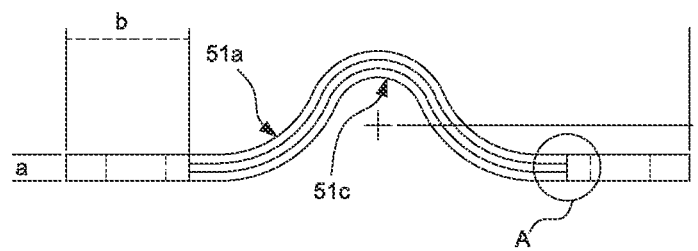
FIG. 3B illustrates a side view of the flexible lead shown in FIG. 3A.
Figure 3C:
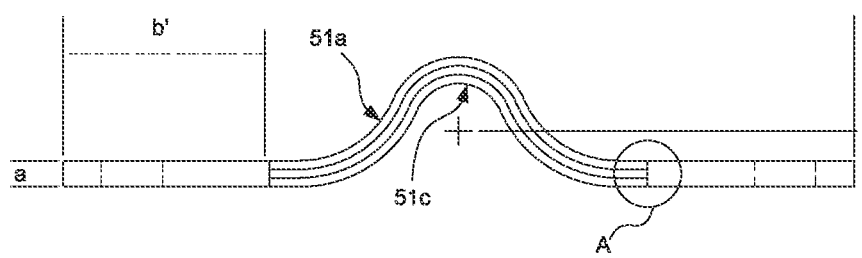
FIG. 3C illustrates a side view of another flexible lead according to certain aspects of the present disclosure.
Figure 3D:
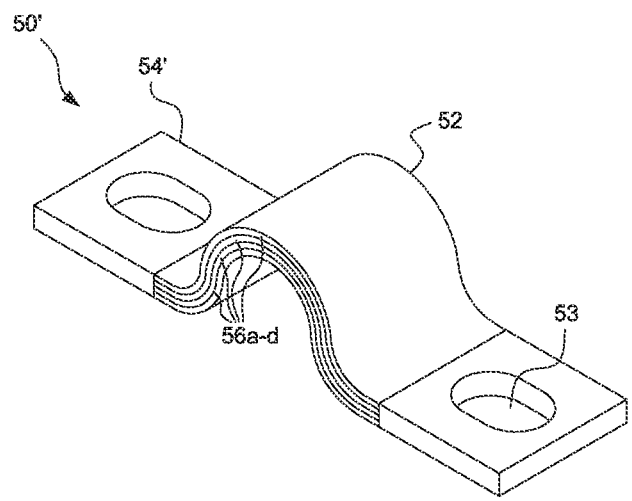
FIG. 3D illustrates a top perspective view of another flexible lead according to certain aspects of the present disclosure.
Figure 3E:
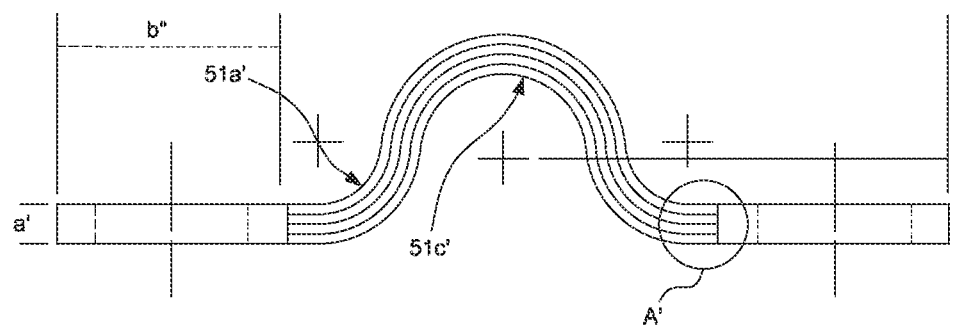
FIG. 3E illustrates a side view of the flexible lead shown in FIG. 3D.

The system provides connection between a winding 20 and a wye ring 114 of the rotating electric machine 100 via flexible leads 50 that will successfully support and allow for dilation of the winding/banding. With reference to FIGS. 3A-3E, the flexible leads (50, 50') comprise at least two laminated copper sheets (layers 56*a-d*) in a central region 52 that is formed into an omega (Ω) shape and end portions 54 at each end of the central region, wherein the end portions are configured for flexible attachment, e.g., apertures 53 for nut and bolt attachments. According to preferred aspects, the flexible leads (50, 50') include three laminated sheets (layers 56*a-c*) in the central region 52 as shown in FIGS. 3A-3C, or four laminated sheets (layers 56*a-d*) in the central region 52 as shown in FIGS. 3D and 3E. Specific design considerations and test results for the flexible leads 50 are detailed in the Examples section.

Also shown in FIGS. 3A-3E are the junctions (A, A') between the central laminated region 52 of the flexible leads (50, 50') and the end portions 54. Of note is that the end portion 54 is generally not laminated, is press welded, or includes brazing to securely and permanently connect any laminations therein. Moreover, the end portions 54 may also include silver plate on at least a top and bottom surface thereof, wherein the silverplate may be deposited on the end portions by electroplating.

The flexible lead (50, 50') is designed to flex during operation as a result of centrifugal dilation of the winding/banding. Moreover, the unique shape of the flexible lead 50 limits stress and strain to acceptable levels to achieve the desired design life. Due to the varying radial spans between the support ring and winding, different lengths of the flexible leads are possible, but they all incorporate a radial length that is greater than the radial span for which they are designed. Moreover, while various shapes are possible and within the scope of the present invention, a preferred shape of the flexible lead according to the present disclosure is the omega shape in the central region 52. For example, according to certain aspects, the additional length may be included in the end portions 54 as shown in FIG. 3C (i.e., length b verses b' in the end region 54). Alternatively, the entire flexible lead may be shortened, as shown in FIGS. 3D and 3E, wherein the central region is compressed (i.e., radius of curvature may be the same ($51c$, $51c'$) or may be smaller ($51a$, $51a'$) in the middle and sides of the omega shape, respectively). Moreover, the length of the end portions 54 may be changed (i.e., length b" in the end region 54). The present inventors have arrived at these unique designs for the flexible leads through extensive testing and model evaluation (see examples).

Figure 5:
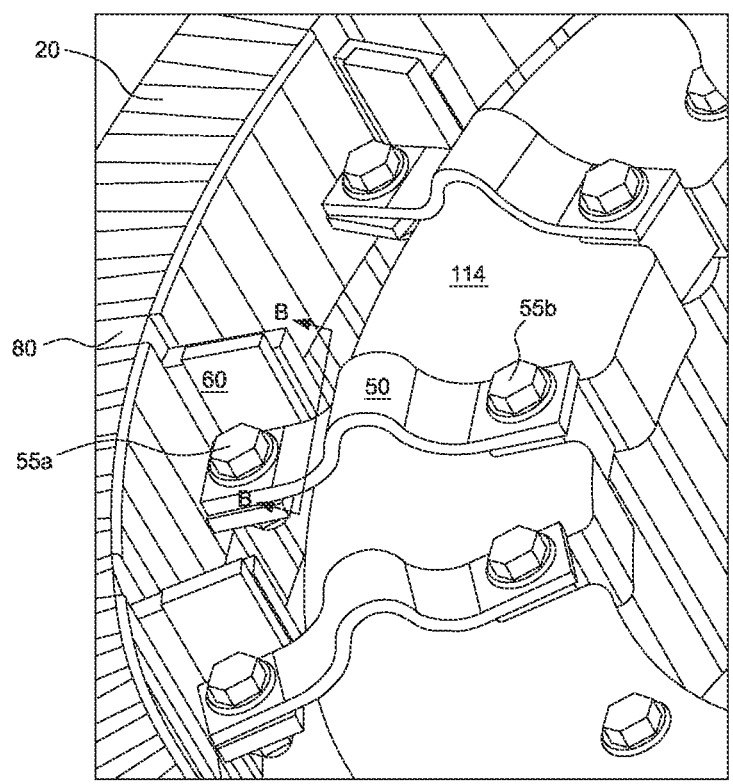
FIG. 5 illustrates one connection scheme according to aspects of the present disclosure between the flexible lead, an attachment lug, and the windings of a rotating electric machine.

The flexible leads 50 are included as part of a system for connection that includes an attachment lug 60. With reference to FIGS. 3A and 5, the flexible lead 50 includes end portions 54 having apertures 53 configured to accept an attachment element. As such, a first end of the flexible lead 50 is connectable at the windings 20 via attachment to the attachment lug 60 and a second end is connectable to the wye ring 114. Each of these connections is via flexible attachment elements such as nut and bolt connections (55*a*, 55*b*).

Exemplary attachment lugs (60A, 60B) are shown in FIGS. 6A and 6B, and generally include an aperture on a bottom portion (64*a*, 64*b*) configured for attachment to the flexible lead 50 via a flexible connection such as a nut and bolt attachment (55*a* as shown in FIGS. 5 and 6C). The attachment lug (60A, 60B) is generally L-shaped and includes an upright side portion (62*a*, 62*b*) that may be brazed to a coil post 80 as shown in FIG. 5. This brazed connection is shown in more detail in FIG. 6C which illustrates a cross-sectional view taken along line B-B of FIG. 5. Also shown is the connection between the end portion 54 of the flexible lead 50 and the bottom portion 64*a* of the attachment lug 60A via the nut/bolt connection 55*a*.

Figure 7:
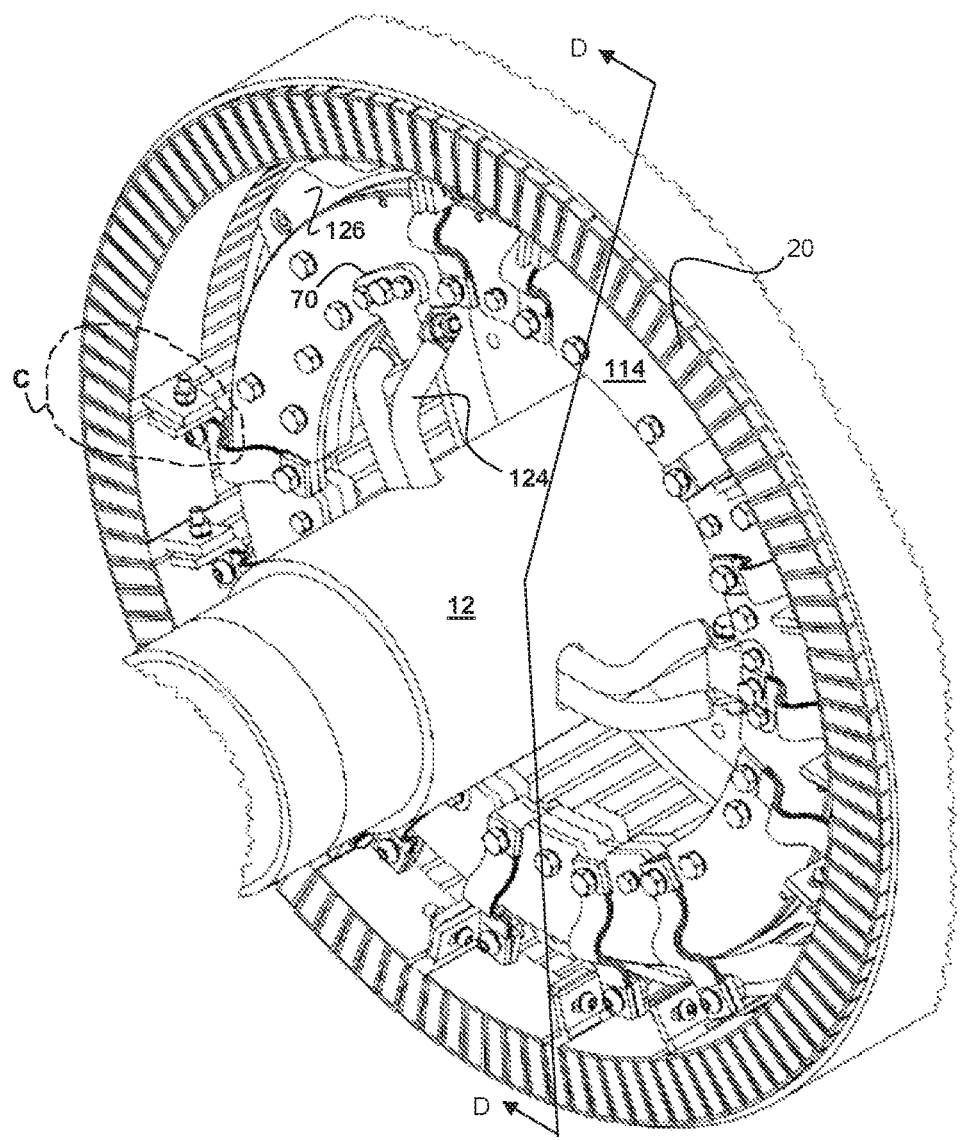
FIG. 7 illustrates components according to aspects of the present disclosure for retrofitting a DFIG.
Figure 8A:
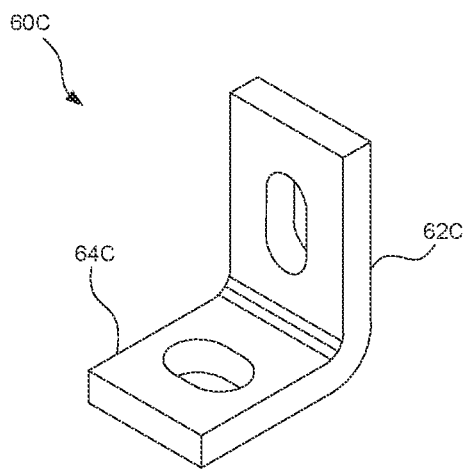
FIG. 8A illustrates an exemplary attachment lug according to aspects of the present disclosure.
Figure 8B:
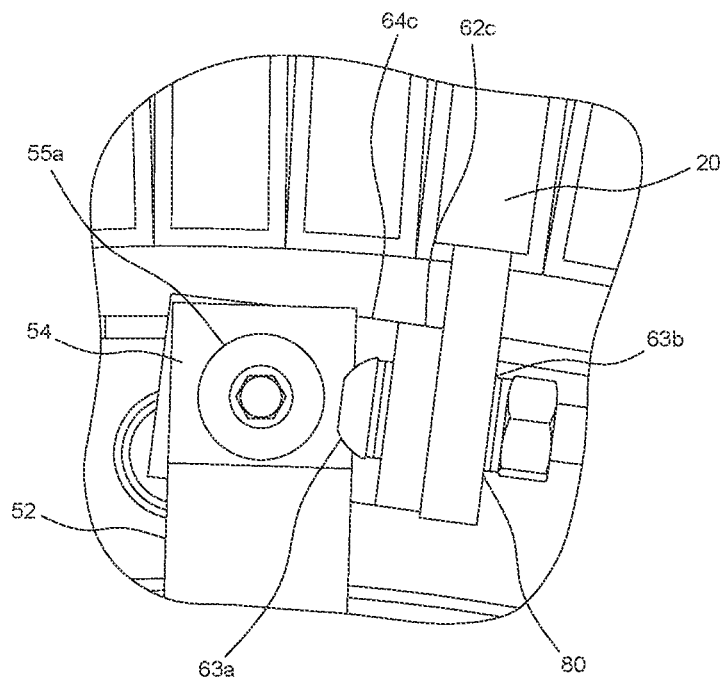
FIG. 8B is an enlargement of section C of FIG. 7 illustrating an exemplary attachment scheme between the flexible lead, the attachment lug of FIG. 8A, and a coil post of the winding of a rotating electric machine.

Shown in FIG. 7 is another exemplary configuration for the attachment of the flexible leads 50 to the winding 20. As shown in FIG. 8B, which illustrates an enlarged view of section C of FIG. 7, the attachment lug 60C may be attached to the coil post 80 via another flexible attachment element such as the nut and bolt connection (63*a* and 63*a*, respectively) shown. As such, another exemplary configuration for the attachment lug 60C includes apertures in both the bottom portion 64*c* and the side portion 62*c* as shown in FIG. 8A.

The inventive connection system disclosed herein comprising a flexible lead 50 and flexible attachments for the lead to the windings 20, i.e., via attachment lug 60, and the wye ring 114 ameliorates the failure modes of the prior art systems noted above. The laminations of the curved flexible lead 50 provide the flexibility to withstand the centrifugal stresses and strains while providing the mechanical strength required to maintain proper positioning and connection of the components.

A major advantage of the nut and bolt connection and attachment lug 60 (e.g., L-bracket) is that the bolt holes may be slotted, allowing for better field adjustment. In general, connections to the field windings may be somewhat variable, i.e., the existing winding position varies from one machine to the next, so one set of wye ring parts with fixed dimensions would not fit in all retrofit applications. As such, the nut and bolt connections allow for minor adjustments that provide improved overall fit. Finally, while not generally understood as flexible, the nut and bolt connections disclosed herein, and in particular, use of the attachment lug 60 for connection to the winding, provide a significant improvement over the prior art brazed straight-line jumpers and leads. Under the centrifugal stresses that induce dilation of the banding and thermal expansion of the winding, the small increase in flexibility of the nut and bolt connections greatly reduces overall wear on the components and the risk for mechanical failure.

Certain recent prior art disclosures have attempted to solve the same problem using curved jumpers and leads, such as those disclosed in U.S. Pat. No. 10,177,621. None of these jumpers and leads include laminations and all are connected to the neutral ring and the windings via brazed connections. While some flexibility may be introduced by providing the additional length afforded by a curved lead, the prior art system lacks the laminations that the present inventors have found to provide the combination of flexibility and structural support that improves component performance and durability.

Additionally, the brazed connections of the jumpers and leads disclosed in U.S. Pat. No. 10,177,621 fail to recognize and solve a major failure mechanism discovered by the present inventors. Such connections are inherently rigid both radially and circumferentially, and thus may still suffer from centrifugal stresses and the plastic strain of multiple starts of the rotor. Moreover, depending on the experience and ability of the installation technician, such connections can introduce points of failure under these types of stresses and strains. Finally, the brazed connections disclosed in U.S. Pat. No. 10,177,621 fail to provide the installer with any means to adjust the positions of the various components. While components of a DFIG may be designed with specific configurations and specifications, when originally manufactured they rarely meet stringent sizing specifications, i.e., one set of components may not suit all DFIGs. For example, the coil position relative to the wye ring is slightly different on every machine. Moreover, through use they tend to change due to the noted stresses and strains. Accordingly, the present inventive components allow for adjustability during installation.

Figure 4B:
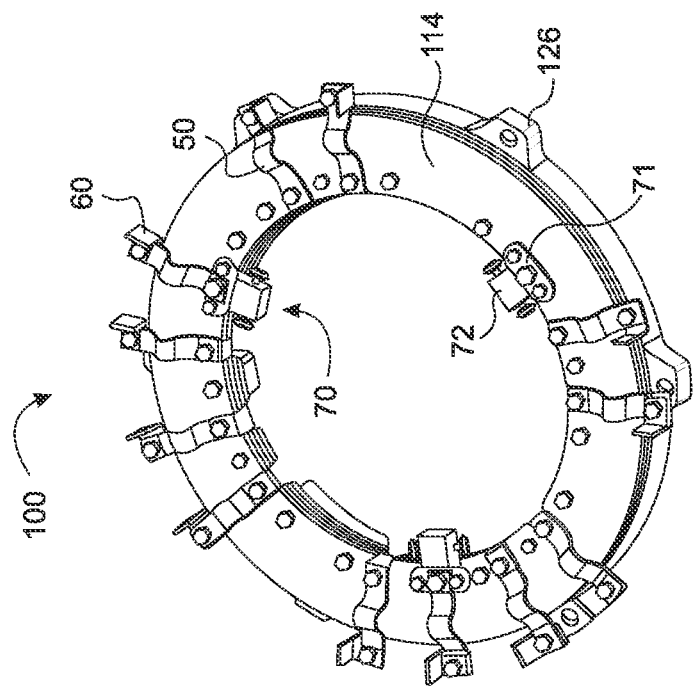
FIG. 4B illustrates a flexible connection system according to aspects of the present disclosure, wherein the flexible leads provide connection between a winding and a wye ring of a rotating electric machine.

Shown in FIGS. 2 and 7 are the main leads 124 that extend from the central rotor shaft 12. These leads are connectable to the main lead connector(s) 70. With reference to FIG. 4B, the main lead connectors 70 include a first end portion 71 attachable to the wye ring 114 via nut and bolt connections, and a second end 72 that extends radially inward toward the central rotor shaft 12. As shown in FIG. 2, the second end 72 includes connection points 75 for the main leads 124. With specific reference to FIG. 12A, the connection points 75 comprise ports in the second end 74 that accept ends of the main leads 124 to provide electrical connection to the phase ring(s) of the wye ring assembly 114.

Figure 11A:
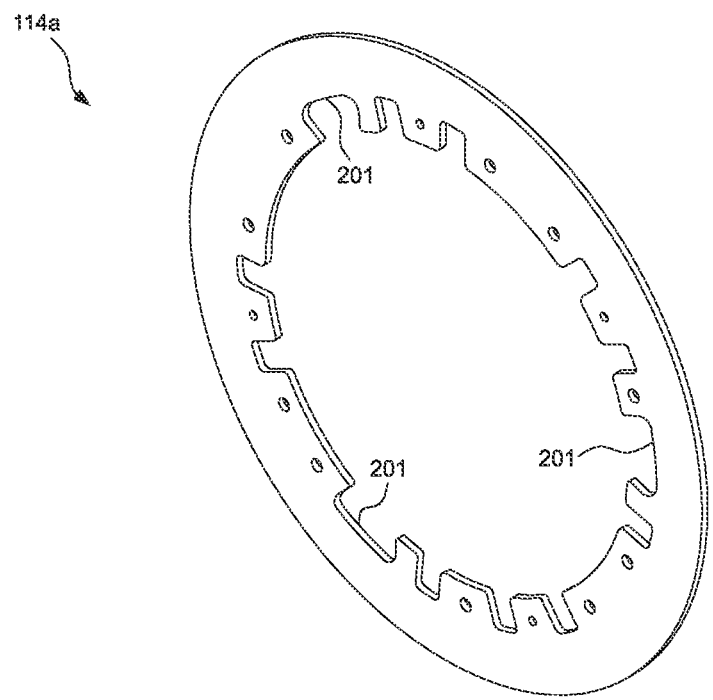
FIGS. 11A-11C illustrate a cover plate, neutral ring, and phase ring, respectively, of the wye ring assembly shown in FIG. 10.
Figure 11B:
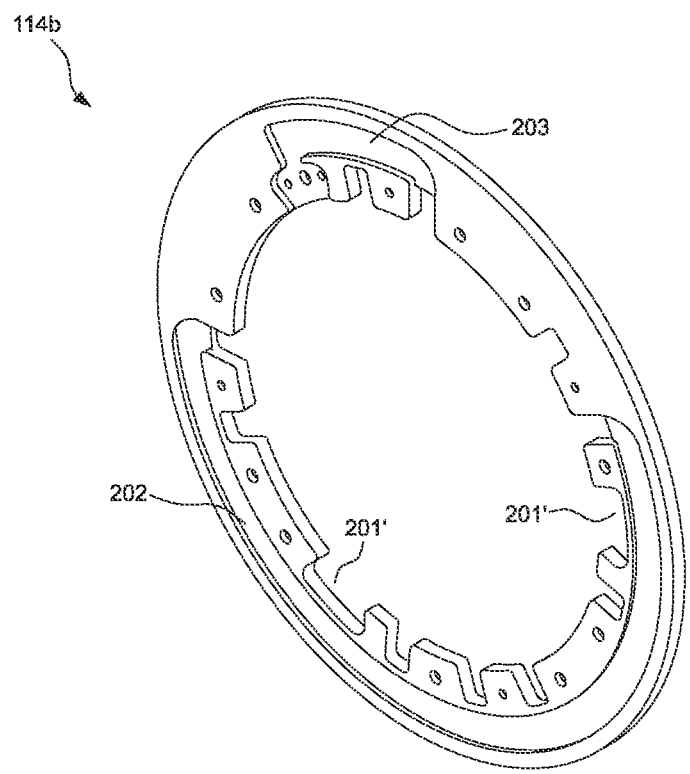
Figure 11C:
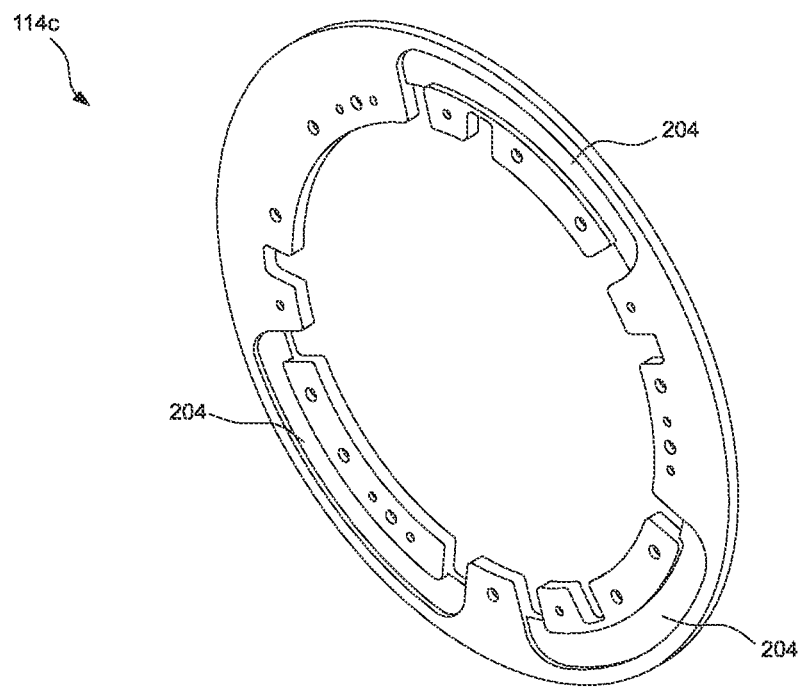
Figure 11D:
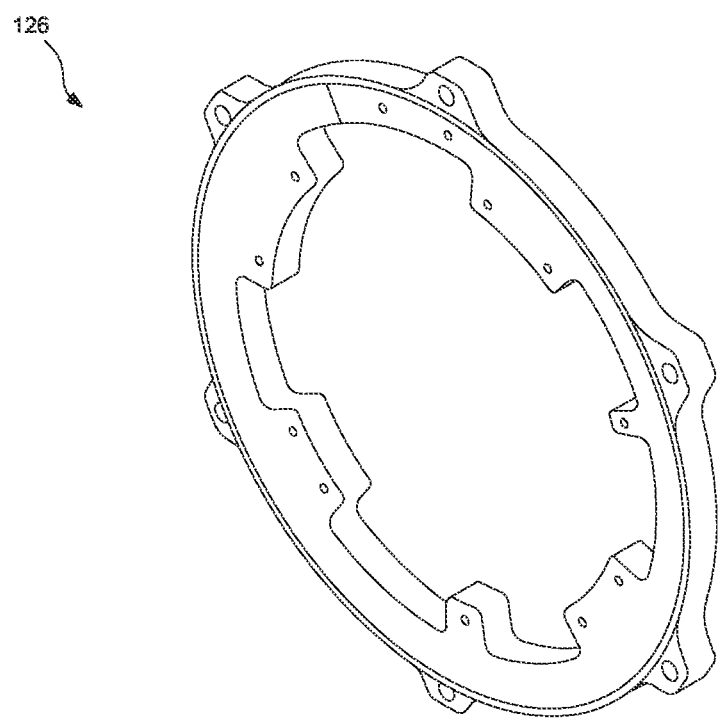
FIG. 11D illustrates a mounting ring according to certain aspects of the present disclosure.
Figure 12A:
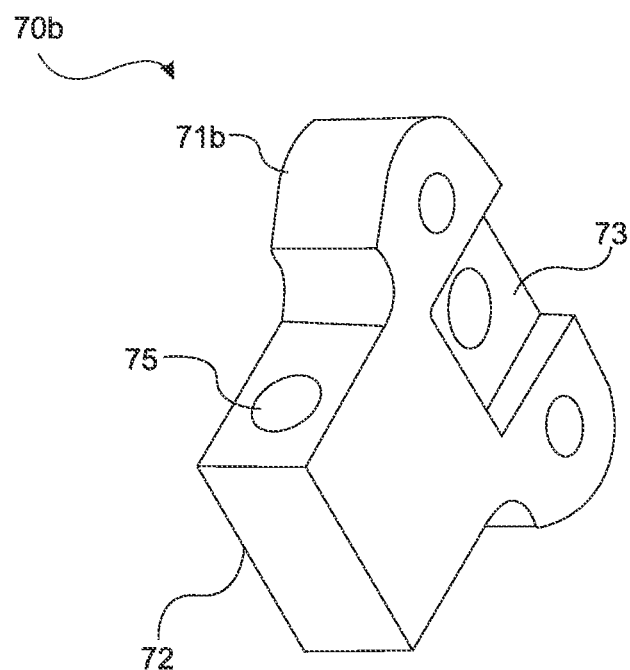
FIGS. 12A and 12B illustrate exemplary main lead mounts according to aspects of the present disclosure.
Figure 12B:
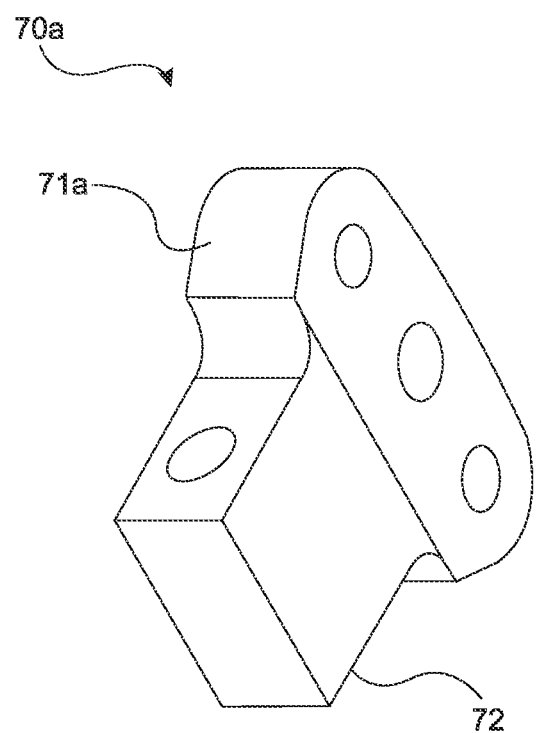

Certain of the flexible leads 50 may be attached to the main lead connectors 70 to provide electrical connection to the windings 20. With reference to FIG. 2, two of the three main lead connectors 70*b* provide attachment for the flexible leads 50, and one main lead connector 70*a* is connection to the wye ring 114 only. Various configurations for the main lead connectors are shown in FIGS. 12A and 12B. As shown, certain configurations of the connector 70*b* include a central depression 73 in the first end portion 71*b*. For example, in certain configurations, one of the three main lead connectors does not interface directly with a flexible lead, but rather with a jumper (neutral ring connection) that connects into the depression and is routed through the cover plate to the neutral ring (plate 114*a* of the wye ring as shown in FIG. 11A and described below).

Design Concept—Wye Ring

Disclosed herein are several unique designs for retrofitting rotating electric machines that utilize many of the same individual components. Each design may be applicable to all DFIGs and may be adapted on a case-by-case basis to specific generator models. A first design is shown in FIGS. 2, 4B, 7, and 9-11A-11I, and additional designs are shown in FIGS. 13-14D.

Figure 10:
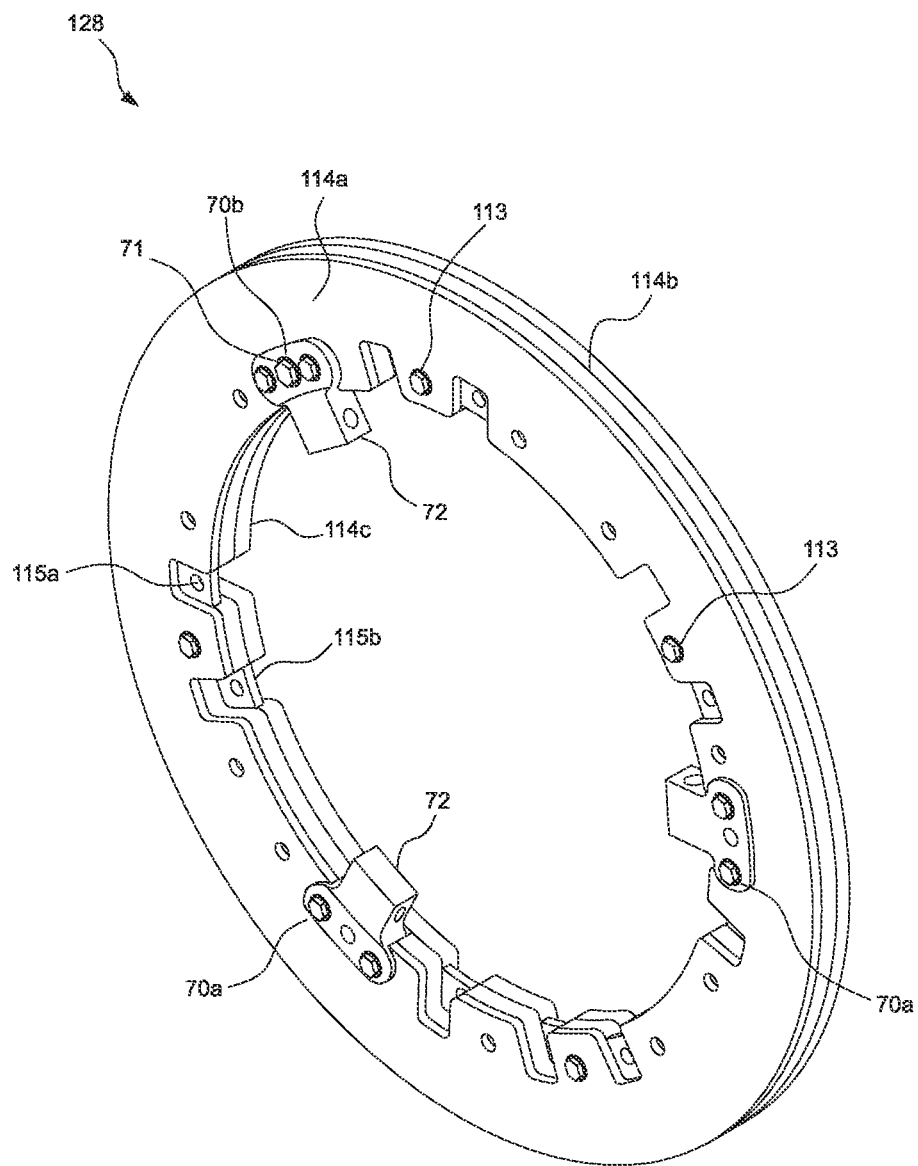
FIG. 10 illustrates a wye ring assembly according to certain aspects of the present disclosure.

With reference to FIG. 10, the present inventors have further developed a new support ring assembly 128 (also referred to herein a wye ring 114) that successfully supports the flexible leads 50 (e.g., attachment points on inner circumference of the assembly 128, such as 115*a*, 115*b*) and main lead connectors (70*a*, 70*b*). The support ring assembly 128 comprises a cover plate (114*a*, FIG. 11A), a neutral ring (114*b*, FIG. 11B), and a phase ring (114*c*, FIG. 11C), each of which is formed of an insulating material such as fiberglass or composite fiberglass. Exemplary materials include composites of fiberglass and epoxy such as GAROLITE.

The support ring assembly 128 may be supported by and attached to a mounting ring (126, see FIG. 11D) that can be shrunk fit or bolted directly onto the rotor shaft 12, such as bolted to support brackets (i.e., spider structure extending radially outward from the rotor shaft). Exemplary materials of the mounting ring include at least aluminum.

Each of the components of the support ring assembly 128 may be stacked axially, with the cover plate positioned on a top surface of the axial stack and the mounting ring positioned and attachable to a bottom surface of the axial stack, such as to a bottom surface of the phase or neutral ring (i.e., position of the phase and neutral rings can be interchangeable).

The support ring assembly 128 includes an open central region configured to surround the central rotor shaft 12 of the rotating electric machine. The mounting ring is configured to be shrunk fit onto the rotor shaft of the rotating electric machine or may be bolted to a spider structure of the rotor.

The cover plate 114*a* generally includes three attachment points 201 on an inner diameter, such as the three cutouts shown in FIG. 11A, wherein each cutout is configured to accept one of the three main lead connectors 70 therein. The neutral ring 114*b* comprises two separate circumferential slots (202, 203) or depressions in a top surface thereof, wherein each slot is configured to accept a neutral ring connector (202*a* shown in FIG. 11F positionable in slot 202 of the neutral ring 114*b*) and a main lead (203*a* shown in FIG. 11E positionable in slot 203 of the neutral ring 114*b*). The neutral ring 114*b* further comprises two cutouts 201' contiguous with the cutouts 201 in the cover plate 114*a* that allow connection with the main lead connectors (70).

Figure 11E:
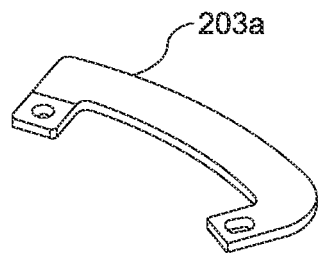
FIGS. 11E-11G illustrate a main lead, a neutral ring connector, and jumper, respectively, according to certain aspects of the present disclosure.
Figure 11F:
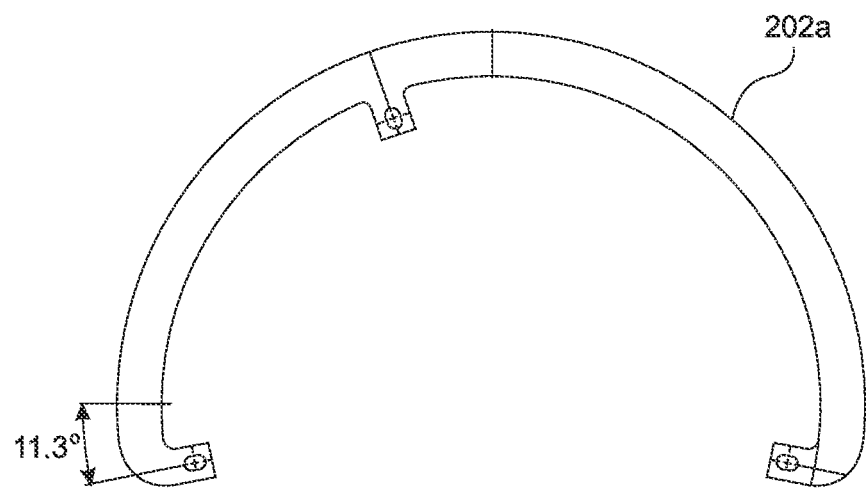
Figure 11G:
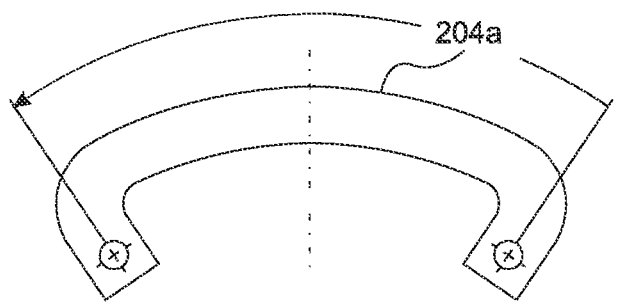
Figure 11H:
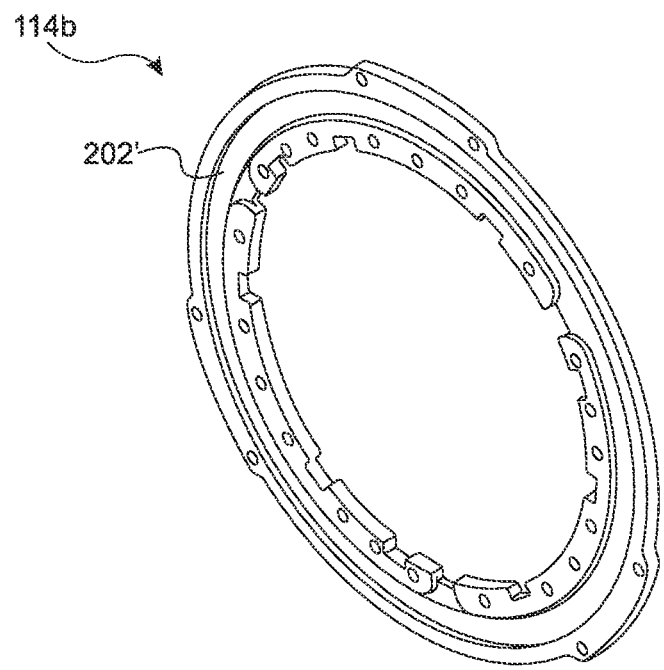
FIG. 11H-11I illustrates an alternate arrangement of a neutral ring and neutral ruing connector, respectively, according to certain aspects of the present disclosure.
Figure 11I:
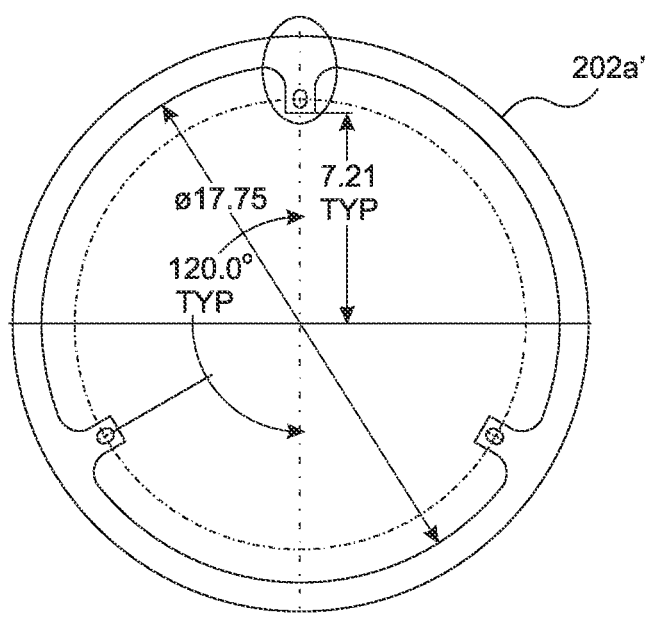

According to certain aspects, the circumferential slots (202, 203) for the neutral ring 114b connectors may be a continuous slot rather than discrete slots, such as slot 202' shown in FIG. 11H configured to accept a continuous neutral ring connector 202a', as shown in FIG. 11I. Finally, the phase ring 114c comprises three separate circumferential slots 204 or depressions in a top surface thereof 204, wherein each slot is configured to accept a jumper (204a shown in FIG. 11G positionable in slot 204 of the phase ring 114c).

Each of the neutral connector 202, main connector 203, and jumpers 204 generally comprise a similar structure, i.e., flat metal bar such as formed of copper as disclosed herein (e.g., as shown in FIG. 11E for the main lead 203a).

While the wye ring shown in FIG. 10 includes the neutral ring sandwiched between the cover plate and the phase ring, other arrangements of the neutral and phase ring are possible and within the scope if the present invention. For example, the phase ring may be positioned below the cover plate with the neutral ring positioned below that. In this scenario, the various cutouts for accepting the main lead connectors and the flexible leads would be reconfigured to provide for proper connectivity.

As shown in FIGS. 7 and 10, according to certain designs of the wye ring, the neutral ring connectors and the jumpers comprise extensions that extend inward toward the inner diameter when the neutral ring connectors and the jumpers are positioned within the neutral ring and the phase ring, respectively. These extensions are configured for connection with the second end portion of the flexible lead. As illustrated in FIG. 10, certain of the layers are shown to include connectors 115a and 115b in the neutral and phase rings, respectfully. These are provided by the neutral ring connectors and the jumpers (see for example ends of jumper 204 in FIG. 11G).

Figure 9:
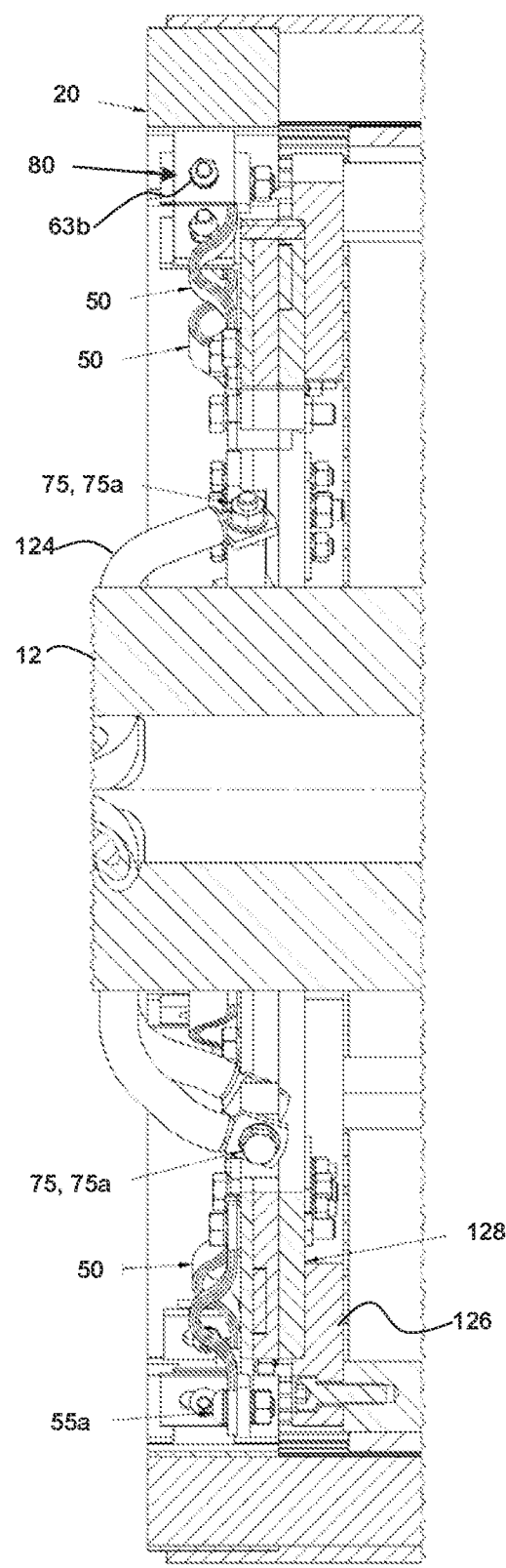
FIG. 9 is a cross-sectional view taken along line D-D of FIG. 7 illustrating components according to aspects of the present disclosure for retrofitting a DFIG.

FIG. 9 illustrates a cross-section taken through line A-A of the inventive wye ring design shown in FIG. 7. This novel design eliminates the previously seen failures with prior art designs by removing the inflexible jumpers, as discussed hereinabove, and further by removal of the existing neutral ring (i.e., provides replacement phase and neutral rings that offer improved flexibility, e.g., separate jumpers). As such, the devices and systems disclosed herein introduce flexibility into the connections between the windings and the phase and neutral ring to accommodate differential expansion under centrifugal load yet remain self-supporting even under conditions of overspeed.

Figure 13A:
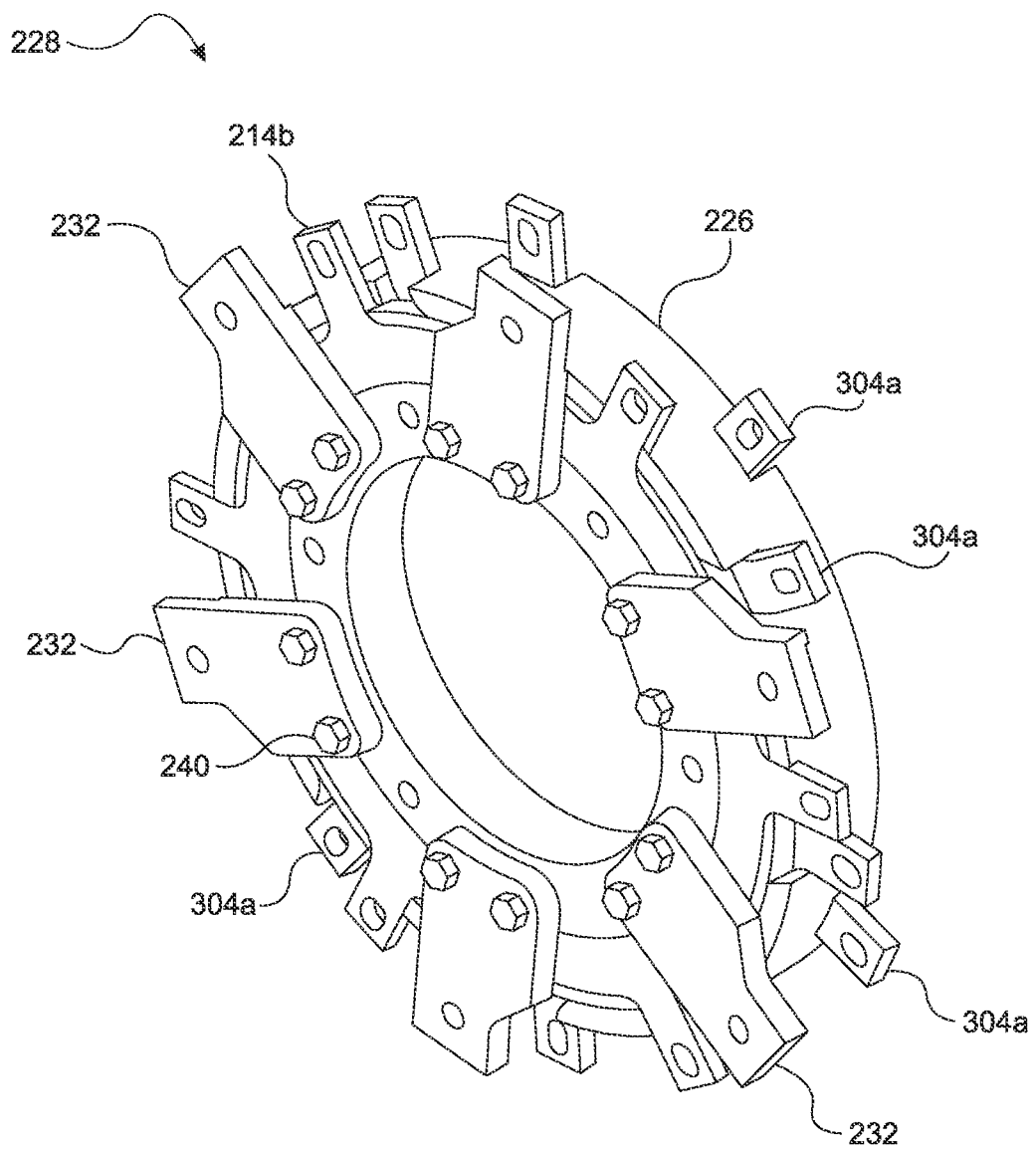
FIGS. 13A and 13B illustrate top and bottom perspective views of an exemplary wye ring system according to aspects of the present disclosure.
Figure 13B:
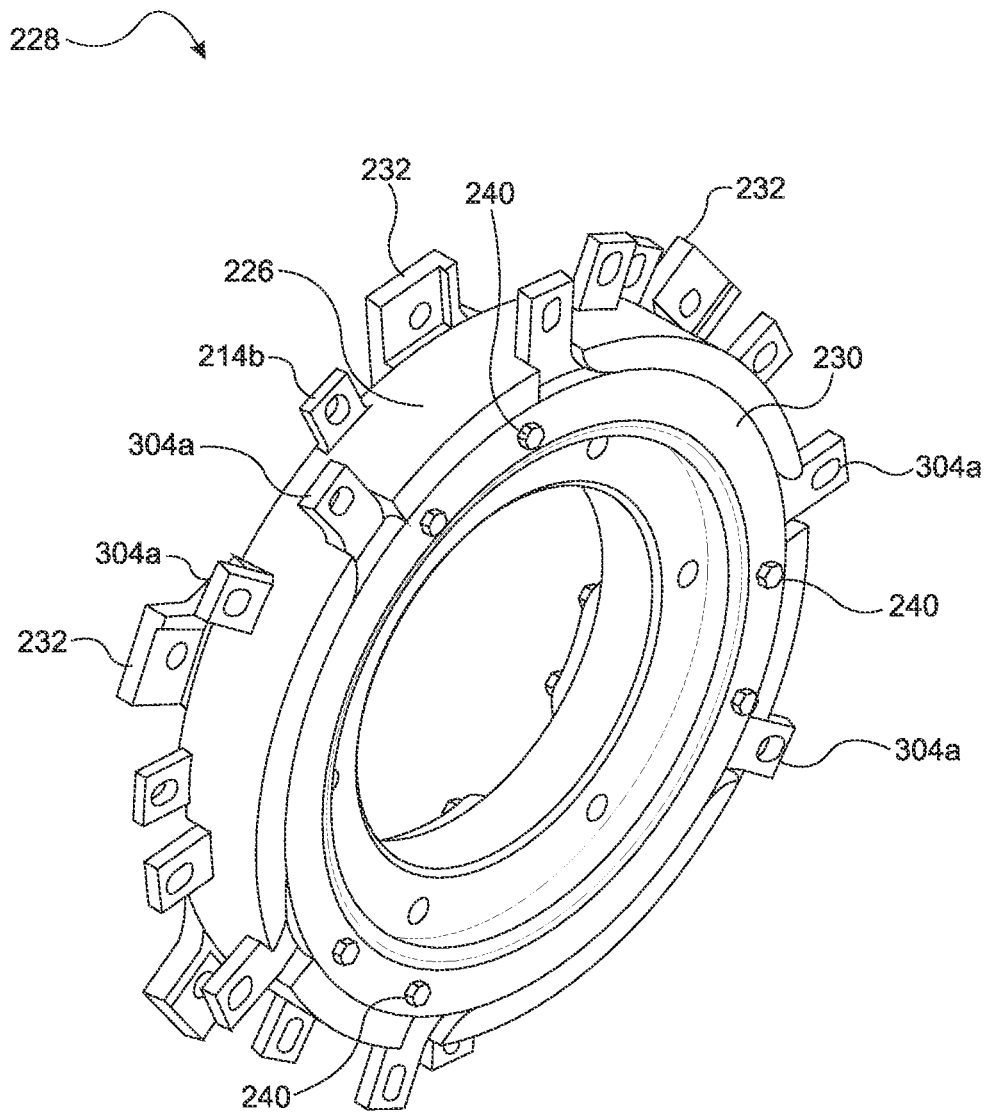

Another exemplary support ring assembly 228 according to the present disclosure is illustrated in FIGS. 13A-13E. The neutral ring 214b and phase ring 226 are shown along with jumpers 304a, a jumper hold down 230, and main lead restraints 232. Each of the main lead restraints 232 act as the cover plate in the support ring assembly 228 as shown in FIG. 13A and are attachable to the phase ring 226 via nut and bolt connections (240). Shown in FIG. 13B is the jumper hold down 230 on a bottom side of the phase ring.

Figure 13C:
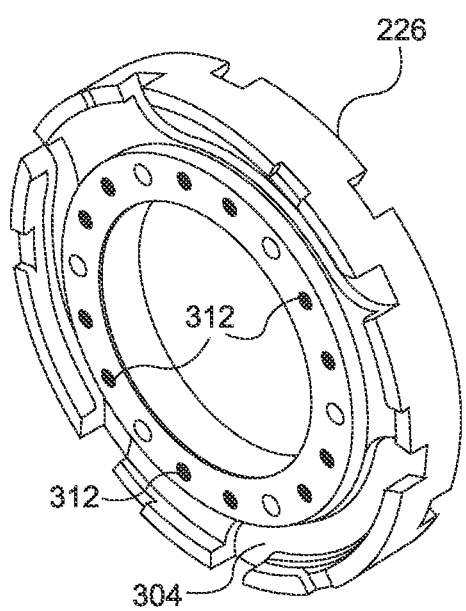
FIGS. 13C and 13D illustrate top and bottom perspective views, respectively, of the phase ring of the wye ring system shown in FIGS. 13A and 13B.
Figure 13D:
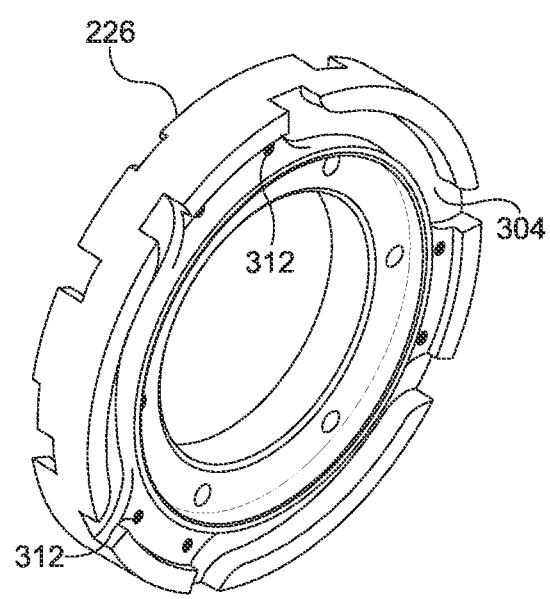
Figure 14:
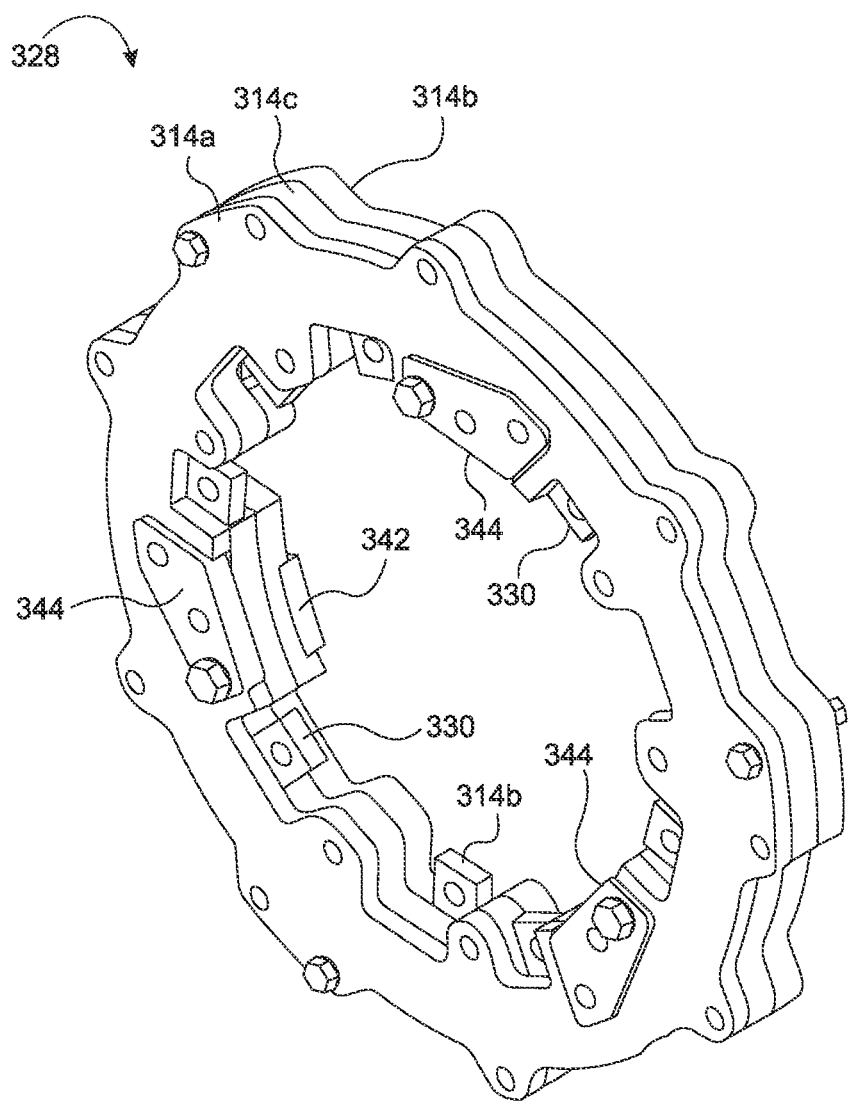
FIG. 14 illustrates a wye ring assembly according to certain aspects of the present disclosure.

With specific reference to FIGS. 13C and 13D, top and bottom perspective views, respectively, of the phase ring 226 are shown. The phase ring 226 includes depressions or cavities 304 configured to accept and position jumpers 304a therein on each side. That is, as shown, each of the top and bottom side of the phase ring 226 include three depressions 304 each configured to hold a jumper 304a therein.

Figure 13E:
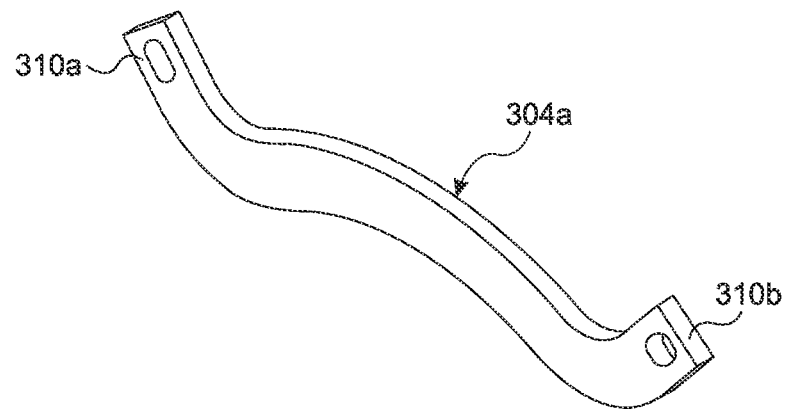
FIGS. 13E and 13F illustrate jumpers and a neutral ring, respectively, of the phase ring of the wye ring system shown in FIGS. 13A and 13B.
Figure 13F:
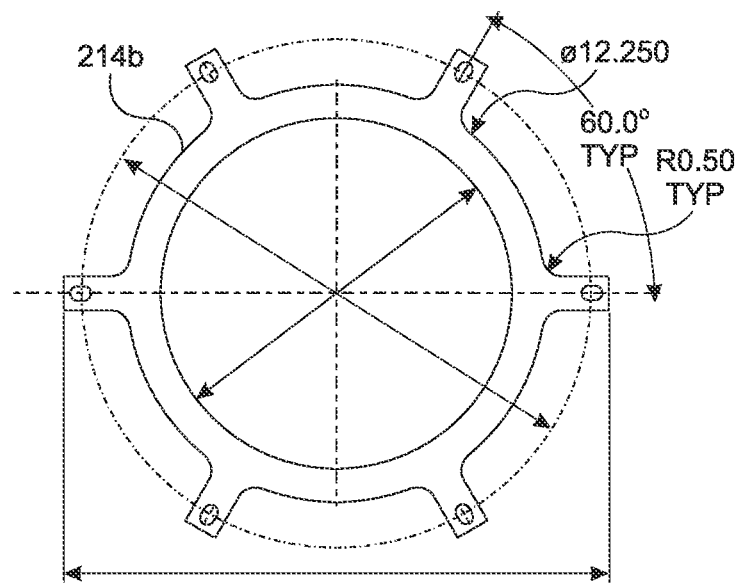

An exemplary jumper 304a is shown in FIG. 13E. The jumpers 304a include connections points (310a, 310b) at either end that provide connection with the flexible leads disclosed hereinabove, such as connection with the second end of the flexible lead via a nut and bolt attachment. The jumpers 304a on the bottom side of the phase ring are held in place by the jumper hold down 230 (see FIG. 13B).

The neutral ring 214b (see FIG. 13F) is positioned adjacent the top surface of the phase ring 226 and is formed of a continuous circle of conductive material. A non-conductive insulation layer may be positioned between the neutral ring 214b and the jumpers 304a that positioned on the top surface of the phase ring 226. Each of the phase ring 226, the jumper hold down 230, and main lead restraints 232 may be formed of an insulating material such as fiberglass or composite fiberglass. Exemplary materials include composites of fiberglass and epoxy such as GAROLITE. Each of the neutral ring and the jumpers may be formed of a conductive material, such as any of the copper materials disclosed herein.

A further additional exemplary support ring assembly 328 is illustrated in FIG. 14. The cover plate 314a, neutral ring 314b, and phase ring 314c are shown along with jumper connections (at end of jumpers 330). A lead restraint backer 342 and copper lead restraints 344 are also illustrated.

General Methods for Installation

The connection systems and novel wye ring designs disclosed herein may be retrofitted to replace OEM parts, and thus repair and/or upgrade existing systems. A general method includes first mounting the inventive phase and neutral rings disclosed herein to a fixed point, typically a fixed location such as steel ring interference fit to the rotor shaft or a steel ring bolted to structural elements welded to the rotor. The phase and neutral rings may be housed within a composite glass/epoxy structure that is designed and sized to carry the mechanical loads of the rings and the heat generated by the current carrying members. Mounting the phase and neutral rings to the (typically) steel ring creates a quasi-fixed point.

The main leads 124 are then connected to a point on the phase and neutral ring assembly. Various structural elements may be incorporated into the phase and neutral housing to carry the centrifugal loads of the main leads (neutral and jumper connections discussed hereinabove). Further, supplemental structural elements may be included to assist in carrying the centrifugal weight of the main leads such as main lead support blocks or lashing rings.

The attachment lugs may be brazed or otherwise connected (e.g., drill apertures for nut/bolt connections) to the existing winding which will in turn connect the radially outboard end of the flexible lead by bolting. Further, the flexible leads may be connected between the phase and neutral rings and the attachment lug, typically by bolting though other means may be used. The flexible leads and the attachment lugs may be supported against centrifugal loads relative to the banding with blocking and/or form in place materials.

The flexible lead disclosed herein is a primary technology of the disclosed invention. Mechanically decoupling the phase and neutral rings from the windings is what predominantly prevents the failures seen in the original designs. By mechanically decoupling the main lead connection point to the winding the extraction of the main leads from the shaft is stopped.

Significant technology and design went into developing the flexible leads so that they may be self-supporting under high centrifugal loads, may not suffer fatigue within the life of a typical doubly fed induction (wind turbine) generator, and are capable of carrying the current loads required within acceptable temperatures. Moreover, the current designs allow the flexible leads to be accessible for visual and non-destructive examination and provides a system that may be field replaceable (performed in a wind turbine nacelle with readily available tools) to extend the life of the wye ring assembly.

The following aspects are disclosed in this application:

Aspect 1: A system for connection between a winding and a wye ring of a rotating electric machine, wherein the wye ring is spaced apart from a central rotor shaft of the rotating electric machine and the winding is spaced apart from the wye ring, the system comprising: an attachment lug; and a flexible lead having a longitudinal extent delimited by a first end portion and a second end portion, wherein the first end portion is configured for connection to the winding via the attachment lug and the second end portion is configured for connection to either of (i) the wye ring or (ii) a first end of a main lead connector, wherein the flexible lead is designed to absorb differential centrifugal displacement between the winding and the wye ring.

Aspect 2. The system according to any previous aspect comprising: a main lead connector having a first end configured for connection to the wye ring and a second end that extends radially inward toward the central rotor shaft and is configured for attachment of main leads that extend from the central rotor shaft.

Aspect 3. The system according to any previous aspect comprising: three main lead connectors and a plurality of flexible leads.

Aspect 4. The system according to any previous aspect, wherein the connections between (a) the attachment lug and the flexible lead, (b) the flexible lead and the wye ring, (c) the flexible lead and the main lead connector, and (d) the main lead connector and the wye ring are via nut and bolt attachments.

Aspect 5. The system according to any previous aspect, wherein the attachment lug is connected to the winding via a coil post of the winding, wherein the connection is a brazed connection or a nut and bolt attachment.

Aspect 6. The system according to any previous aspect, wherein the flexible lead comprises a curved central section spanning the region between the first and second end portions, wherein the curved central section is formed of two or more layers of copper.

Aspect 7. The system according to any previous aspect, wherein the flexible lead has an extended length from a first end to a second end that is longer than a longitudinal distance between the first and second ends.

Aspect 8. The system according to any previous comprising: a wye ring having an open central region configured to surround the central rotor shaft of the rotating electric machine, the wye ring comprising: a cover plate comprising three connection points on an inner diameter, each connection point configured to accept one of the three main lead connectors therein; a neutral ring comprising (i) two separate circumferential slots in a top surface thereof, each slot having a neutral ring connector positioned therein, or (ii) one continuous circumferential slot in the top surface thereof having one continuous neutral ring positioned therein; and a phase ring comprising three separate circumferential slots in a top surface thereof, each slot having a jumper positioned therein, wherein each of the neutral ring, phase ring, and cover plate are formed of an insulating material, and each of the neutral ring connectors and jumpers are formed of a conductive material, and wherein the cover plate, neutral ring, and phase ring form an axial stack with the cover plate position at one end and either of the neutral ring or the phase ring at the other end.

Aspect 9: The system according to aspect 8, wherein the cover plate is formed as three or more separate plates attachable to a top surface of the axial stack.

Aspect 10: The system according to any one of aspects 8 or 9, wherein the neutral ring connectors and the jumpers comprise extensions that extend inward toward the inner diameter when the neutral ring connectors and the jumpers are positioned within the neutral ring and the phase ring, respectively, and wherein the extensions are configured for connection with the second end portion of the flexible lead.

Aspect 11: The system according to any one of aspects 8 to 10 comprising: a mounting ring attachable to a bottom surface of the axial stack opposite the cover plate, wherein the mounting ring is configured to be shrunk fit or bolted onto the rotor shaft of the rotating electric machine.

Aspect 12: The system according to any one of aspects 1 to 7 comprising: a wye ring having an open central region configured to surround the central rotor shaft of the rotating electric machine, the wye ring comprising: a neutral ring comprising connection points for the flexible leads along an outer diameter; a phase ring comprising discrete circumferential slots in a top surface, a bottom surface, or both the top and bottom surfaces, each slot having a jumper positioned therein; a cover plate attachable to a top surface of the phase ring with the neutral ring positioned therebetween, the cover plate comprising connection points on an outer diameter configured for attachment of main leads that extend from the central rotor shaft; and a mounting ring attachable to a bottom surface of the phase ring, wherein the mounting ring is configured to be shrunk fit or bolted onto the rotor shaft of the rotating electric machine, and wherein the phase ring and cover plate are formed of an insulating material, and the neutral ring and jumpers are formed of a conductive material.

Aspect 13. The system according to aspect 12, wherein the cover plate is configured as six discrete main lead restraints.

Aspect 14. A system for retrofitting a rotating electric machine comprising a central rotor shaft and a winding spaced apart therefrom, the system comprising: a wye ring according to any one of aspects 8 to 13, and a flexible lead according to any one of aspects 1 to 7.

EXAMPLE

Fatigue Testing of the Flexible Lead

The flexible lead 50 was designed to include an omega shape (others are possible, such as a "gooseneck" shape) and several laminations to provide maximum flexibility while simultaneously providing the self-supporting capability required to withstand centrifugal forces. Each end portion 54 represents a consolidated region where the various laminations have been joined by brazing, welding, soldering, or bolting together. In other designs, such as the gooseneck design, a solid cross section may be used, or a hybrid cross section may be used where the cross section is comprised of strategically placed strain relief feature(s) such as a notch or slot.

The omega shaped, laminated design of the flexible lead 50, as shown in FIGS. 3A-3C, was simulated using mathematical analysis software and 3D modeling. Each geometric feature was assigned a variable, such as the length (b, b') of the end portions 54, the thickness a, the radius of the curved central region (52), the width, and the number of laminations, as well as the current carrying requirements and allowable operating temperature. The simulations used material properties based on a flexible lead 50 formed of electrolytic tough pitch copper, although other alloys can be used such as oxygen free high conductivity copper or various aluminum alloys.

These simulations produced calculated stress, strain, and deflection performance characteristics for each geometric combination. The inventive flexible lead 50 disclosed herein was found to provide excellent operation through a range of rotational velocities. For example, at speed, the mass of the copper on the end winding applies an outward centrifugal force on the banding, forcing the banding to dilate. The inventive flexible lead 50 is designed to flex during operation as a result of banding radial dilation. The present inventors have found that the shape of the laminated central region limits stress and strain to acceptable levels that extend the life of the rotary machine's connections.

An exemplary design for the inventive flexible lead 50 includes three copper laminations of 0.062 inches each, resulting in an overall thickness of 0.186 inches and a width of 1 inch. The top, middle, and bottom laminations (56*a-c*, respectively of FIG. 3A) were analyzed individually. Each lamination was analyzed through the range of possible operating conditions (overspeed, rated speed, 50% percent speed, and pinwheel). The dilation at each rotational velocity was calculated. The applied rotational velocities and dilations for the final four load steps are tabulated in Table 1. This analysis cycles the lamination to overspeed nine times. The purpose of these load steps is to capture changes in stress and strain as the lamination cycles through the range of operating conditions.

TABLE 1

| Load Step | Rotational Velocity (RPM) | Radial Dilation (inch) |
|---|---|---|
| 29 | 100 | 0 |
| 30 | 680 | 0.003 |
| 31 | 1360 | 0.0107 |
| 32 | 1904 | 0.0209 |

Comparative analysis of the three laminations showed that they are well balanced, meaning there is no significant difference in stress or strain between the laminations.

The stress and strain results from the final four load steps shown in Table 1 were used to calculate the fatigue life results of the inventive flexible lead 50. These load steps capture the range of potential operating conditions. The numbers used for this fatigue life evaluation were calculated based on historic averages from locations in the U.S. The fatigue life is highly dependent on the wind conditions experienced by the unit. The fatigue life results using Coffin-Manson and Smith-Watson-Topper strain-based fatigue methodology for each lamination are tabulated in Table 2. These results assume the unit will experience one overspeed per day and uses a dilation that is 1.5 times the calculated value (Table 1). The "large" radius (radius located at the peak of the omega), "small" radius (radius located on the inboard side of the omega), and location of max strain nearest the boundary condition. These locations experience the largest strain and are the areas of concern for potential fatigue failure.

TABLE 2

| | | Fatigue Life (Years) | |
|---|---|---|---|
| Lamination | Result Location | Coffin-Manson | Smith-Watson-Topper |
| Top 55a | Large Radius | 166 | 1.5E3 |
| | Small Radius | 3.6E7 | 4.1E6 |
| | Boundary Condition | 1.2E8 | 6E6 |
| Middle 55b | Large Radius | 35 | 270 |
| | Small Radius | 2E8 | 1.1E7 |
| | Boundary Condition | 1.6E8 | 1.1E7 |
| Bottom 55c | Large Radius | 16 | 104 |
| | Small Radius | 7.2E8 | 2.3E7 |
| | Boundary Condition | 2.6E8 | 8.7E6 |

Figure 4A:
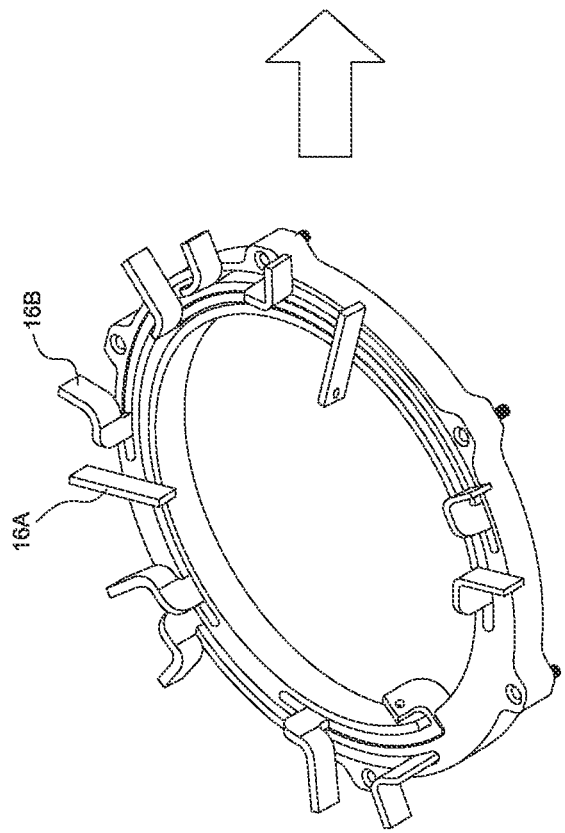
FIG. 4A illustrates connectors on a wye ring in a prior art design, wherein the rigid jumpers are shown extending from the wye ring outward for a brazed connection with the windings of a rotating electric machine.

Similar analyses were carried out with a prior art connector, such as shown in FIG. 4A. A comparison of the fatigue life of the inventive flexible connectors and the prior art connectors demonstrated that the flexible connectors disclosed herein have a fatigue life at least 50% greater than the prior art, i.e., service life at least 50% longer than prior art designs, showing durability over tens of thousands of starts.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A system for connection between a winding and a wye ring of a rotating electric machine, wherein the wye ring is spaced apart from a central rotor shaft of the rotating electric machine and the winding is spaced apart from the wye ring, the system comprising:
    an attachment lug; and
    a flexible lead having a longitudinal extent delimited by a first end portion and a second end portion, wherein the first end portion is configured for connection to the winding via the attachment lug and the second end portion is configured for connection to either of (i) the wye ring or (ii) a first end of a main lead connector,
    wherein the flexible lead is designed to absorb differential centrifugal displacement between the winding and the wye ring.

2. The system of claim 1, further comprising:
    a main lead connector having a first end configured for connection to the wye ring and a second end that extends radially inward toward the central rotor shaft and is configured for attachment of main leads that extend from the central rotor shaft.

3. The system of claim 2, comprising three main lead connectors and a plurality of flexible leads.

4. The system of claim 2, wherein the connections between (a) the attachment lug and the flexible lead, (b) the flexible lead and the wye ring, (c) the flexible lead and the main lead connector, and (d) the main lead connector and the wye ring are via nut and bolt attachments.

5. The system of claim 1, wherein the attachment lug is connected to the winding via a coil post of the winding, wherein the connection is a brazed connection or a nut and bolt attachment.

6. The system of claim 1, wherein the flexible lead comprises a curved central section spanning the region between the first and second end portions, wherein the curved central section is formed of two or more layers of copper.

7. The system of claim 6, wherein the flexible lead has an extended length from a first end to a second end that is longer than a longitudinal distance between the first and second ends.

8. The system of claim 3, further comprising a wye ring having an open central region configured to surround the central rotor shaft of the rotating electric machine, the wye ring comprising:
 a cover plate comprising three connection points on an inner diameter, each connection point configured to accept one of the three main lead connectors therein;
 a neutral ring comprising (i) two separate circumferential slots in a top surface thereof, each slot having a neutral ring connector positioned therein, or (ii) one continuous circumferential slot in the top surface thereof having one continuous neutral ring positioned therein; and
 a phase ring comprising three separate circumferential slots in a top surface thereof, each slot having a jumper positioned therein,
 wherein each of the neutral ring, phase ring, and cover plate are formed of an insulating material, and each of the neutral ring connectors and jumpers are formed of a conductive material, and
 wherein the cover plate, neutral ring, and phase ring form an axial stack with the cover plate position at one end and either of the neutral ring or the phase ring at the other end.

9. The system of claim 8, wherein the cover plate is formed as three or more separate plates attachable to a top surface of the axial stack.

10. The system of claim 8, wherein the neutral ring connectors and the jumpers comprise extensions that extend inward toward the inner diameter when the neutral ring connectors and the jumpers are positioned within the neutral ring and the phase ring, respectively, and wherein the extensions are configured for connection with the second end portion of the flexible lead.

11. The system of claim 8, further comprising a mounting ring attachable to a bottom surface of the axial stack opposite the cover plate, wherein the mounting ring is configured to be shrunk fit or bolted onto the rotor shaft of the rotating electric machine.

12. The system of claim 1, further comprising a wye ring having an open central region configured to surround the central rotor shaft of the rotating electric machine, the wye ring comprising:
 a neutral ring comprising connection points for the flexible leads along an outer diameter;
 a phase ring comprising discrete circumferential slots in a top surface, a bottom surface, or both the top and bottom surfaces, each slot having a jumper positioned therein;
 a cover plate attachable to a top surface of the phase ring with the neutral ring positioned therebetween, the cover plate comprising connection points on an outer diameter configured for attachment of main leads that extend from the central rotor shaft; and
 a mounting ring attachable to a bottom surface of the phase ring, wherein the mounting ring is configured to be shrunk fit or bolted onto the rotor shaft of the rotating electric machine,
 wherein the phase ring and cover plate are formed of an insulating material, and the neutral ring and jumpers are formed of a conductive material.

13. The system of claim 12, wherein the cover plate is configured as six discrete main lead restraints.

14. A system for retrofitting a rotating electric machine comprising a central rotor shaft and a winding spaced apart therefrom, the system comprising:
 a wye ring having an open central region configured to surround the central rotor shaft of the rotating electric machine, the wye ring comprising:
  a cover plate comprising three connection points along an inner circumference thereof, each connection point configured to accept one of three main lead connectors thereon,
  a neutral ring comprising (i) two separate circumferential slots in a top surface thereof, each slot having a neutral ring connector positioned therein, or (ii) one continuous circumferential slot in the top surface thereof having one continuous neutral ring positioned therein, and
  a phase ring comprising three separate circumferential slots in a top surface thereof, each slot having a jumper positioned therein,
  wherein each of the neutral ring, phase ring, and cover plate are formed of an insulating material, and each of the neutral ring connectors and jumpers are formed of a conductive material, and
  wherein the cover plate, neutral ring, and phase ring form an axial stack with the cover plate at one end and either of the neutral ring or the phase ring at the other end; and
 a flexible connector system comprising:
  an attachment lug, and
  a flexible lead having a longitudinal extent delimited by a first end portion and a second end portion, wherein the first end portion is configured for connection to the winding via the attachment lug and the second end portion is configured for attachment to the wye ring,
  wherein the flexible lead is designed to absorb differential centrifugal strains between the winding and the wye ring.

15. The system of claim 14, wherein the flexible lead comprises a curved central section spanning the region between the first and second end portions, wherein the curved central section is formed of two or more laminated layers of copper, and
 wherein the flexible lead has an extended length from a first end to a second end that is longer than a longitudinal distance between the first and second ends.

16. The system of claim 14, wherein the connection points in the cover plate are each configured to accept a first end of a main lead connector, wherein a second end of the main lead connector extends radially inward toward the central rotor shaft and is configured for attachment of main leads that extend from the central rotor shaft.

17. The system of claim 14, wherein the cover plate is formed as three or more separate plates attachable to a top surface of the axial stack.

18. The system of claim 14, wherein the neutral ring connectors and the jumpers comprise extensions that extend inward toward the inner diameter when the neutral ring connectors and the jumpers are positioned within the neutral ring and the phase ring, respectively, and wherein the extensions are configured for connection with the second end portion of the flexible lead.

19. The system of claim 14, further comprising a mounting ring attachable to a bottom surface of the axial stack opposite the cover plate, wherein the mounting ring is configured to be shrunk fit or bolted onto the rotor shaft of the rotating electric machine.

20. A system for retrofitting a rotating electric machine comprising a central rotor shaft and a winding spaced apart therefrom, the system comprising:
 a wye ring having an open central region configured to surround the central rotor shaft of the rotating electric machine, the wye ring comprising:
  a neutral ring comprising connection points for flexible leads along an outer diameter,
  a phase ring comprising discrete circumferential slots in a top surface, a bottom surface, or both the top and bottom surfaces, each slot having a jumper positioned therein,
  a cover plate attachable to a top surface of the phase ring with the neutral ring positioned therebetween, the cover plate comprising connection points on an outer diameter configured for attachment of main leads that extend from the central rotor shaft, and
  a mounting ring attachable to a bottom surface of the phase ring, wherein the mounting ring is configured to be shrunk fit or bolted onto the rotor shaft of the rotating electric machine,
  wherein the phase ring and cover plate are formed of an insulating material, and the neutral ring and jumpers are formed of a conductive material; and
 a flexible connector system comprising:
  an attachment lug, and
  flexible leads having a longitudinal extent delimited by a first end portion and a second end portion, wherein the first end portion is configured for connection to the winding via the attachment lug and the second end portion is configured for connection to the connection points on the neutral ring and the jumpers,
  wherein the flexible lead is designed to absorb differential centrifugal displacement between the winding and the neutral ring and ring.

* * * * *